INVENTOR
*NED H. ABRAMS*
BY *Arlington C. White*
ATTORNEY

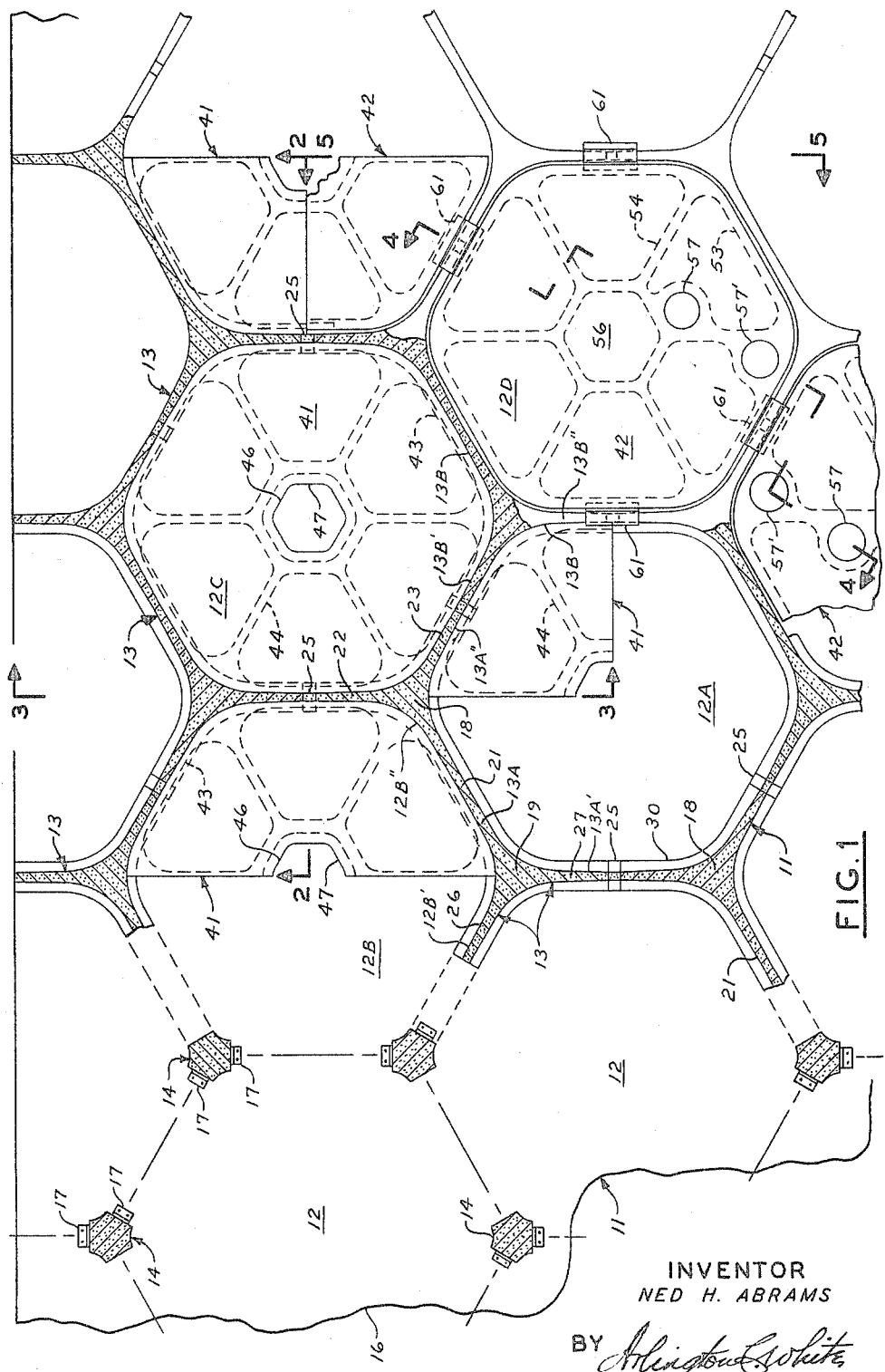

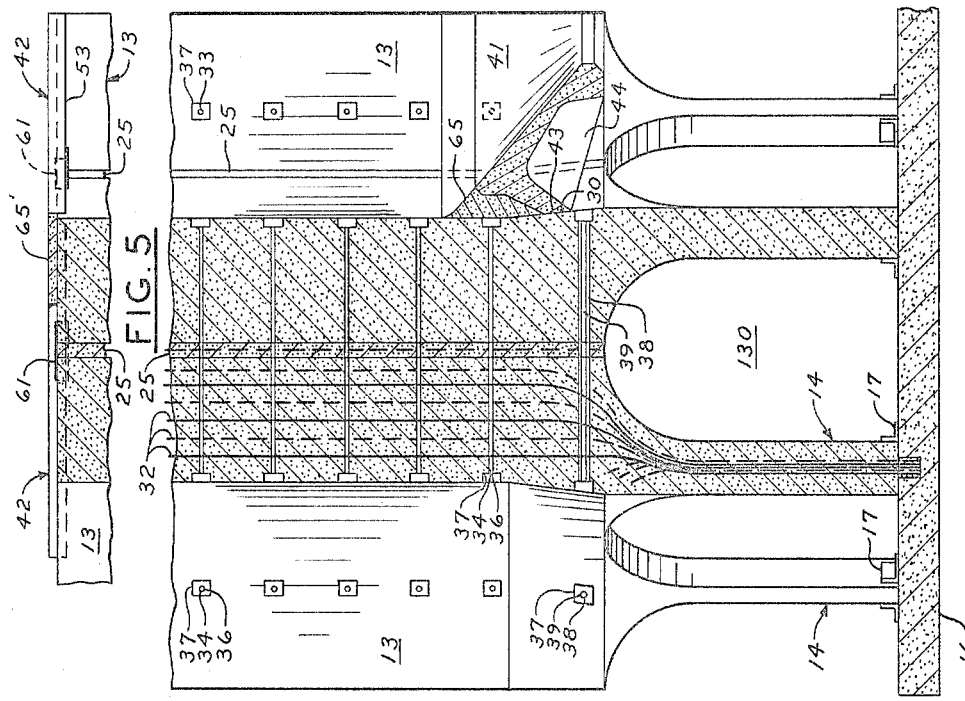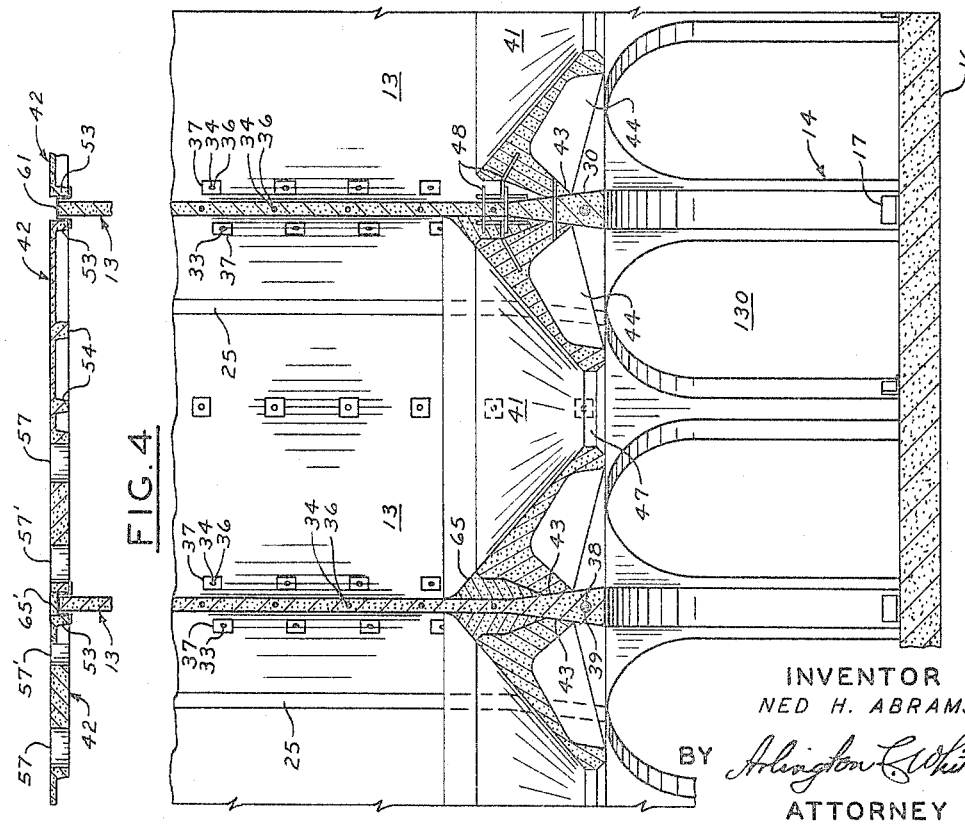

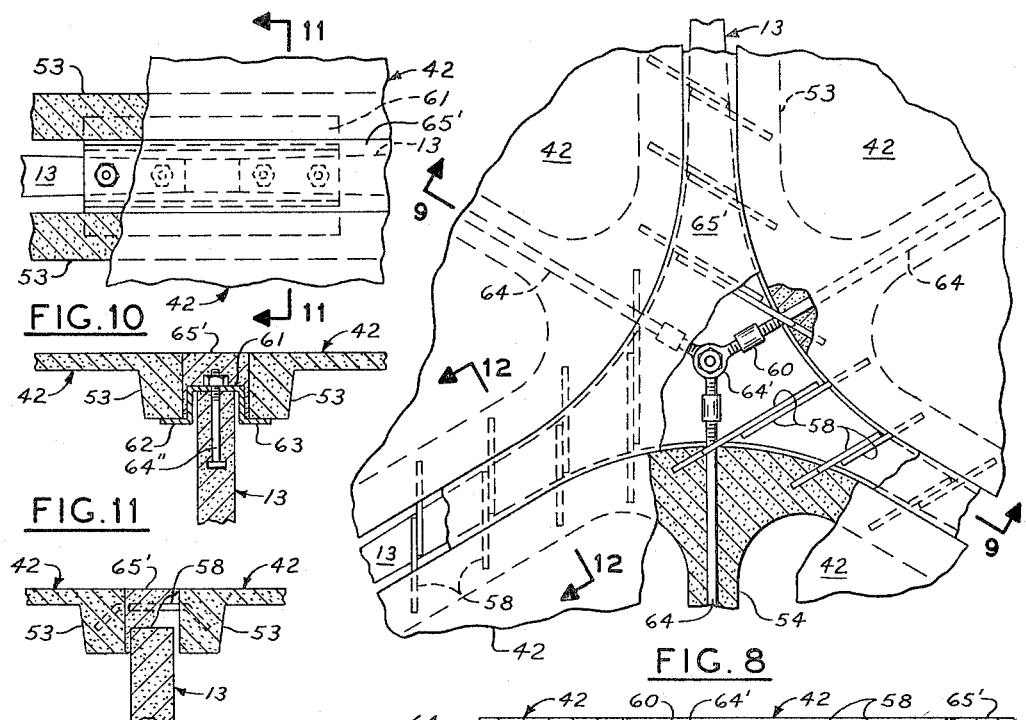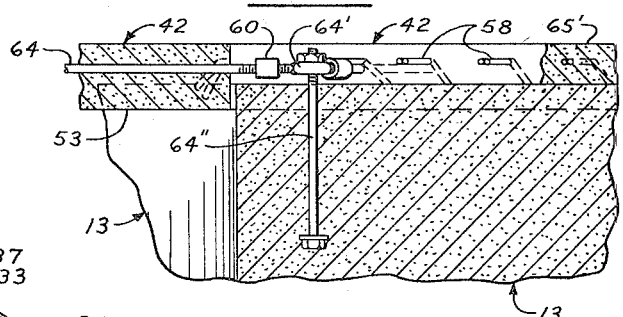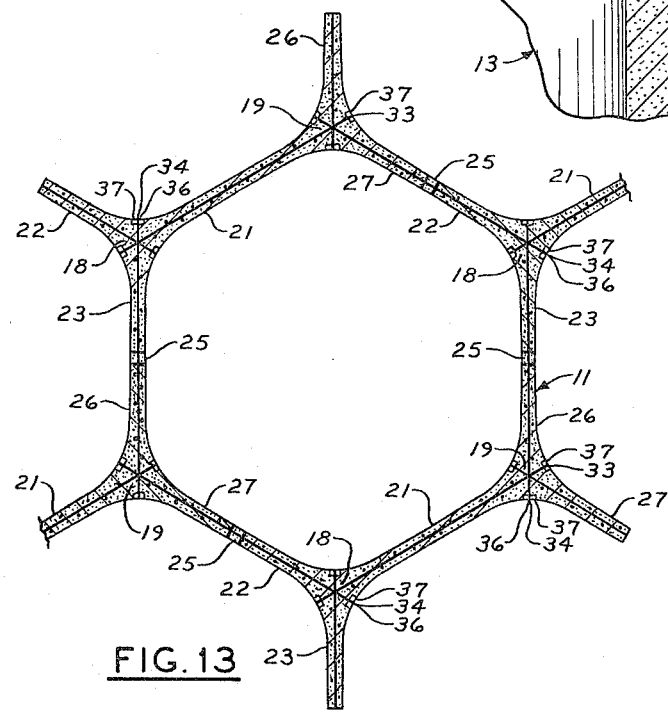

INVENTOR
NED H. ABRAMS
BY Arlington C. White
ATTORNEY

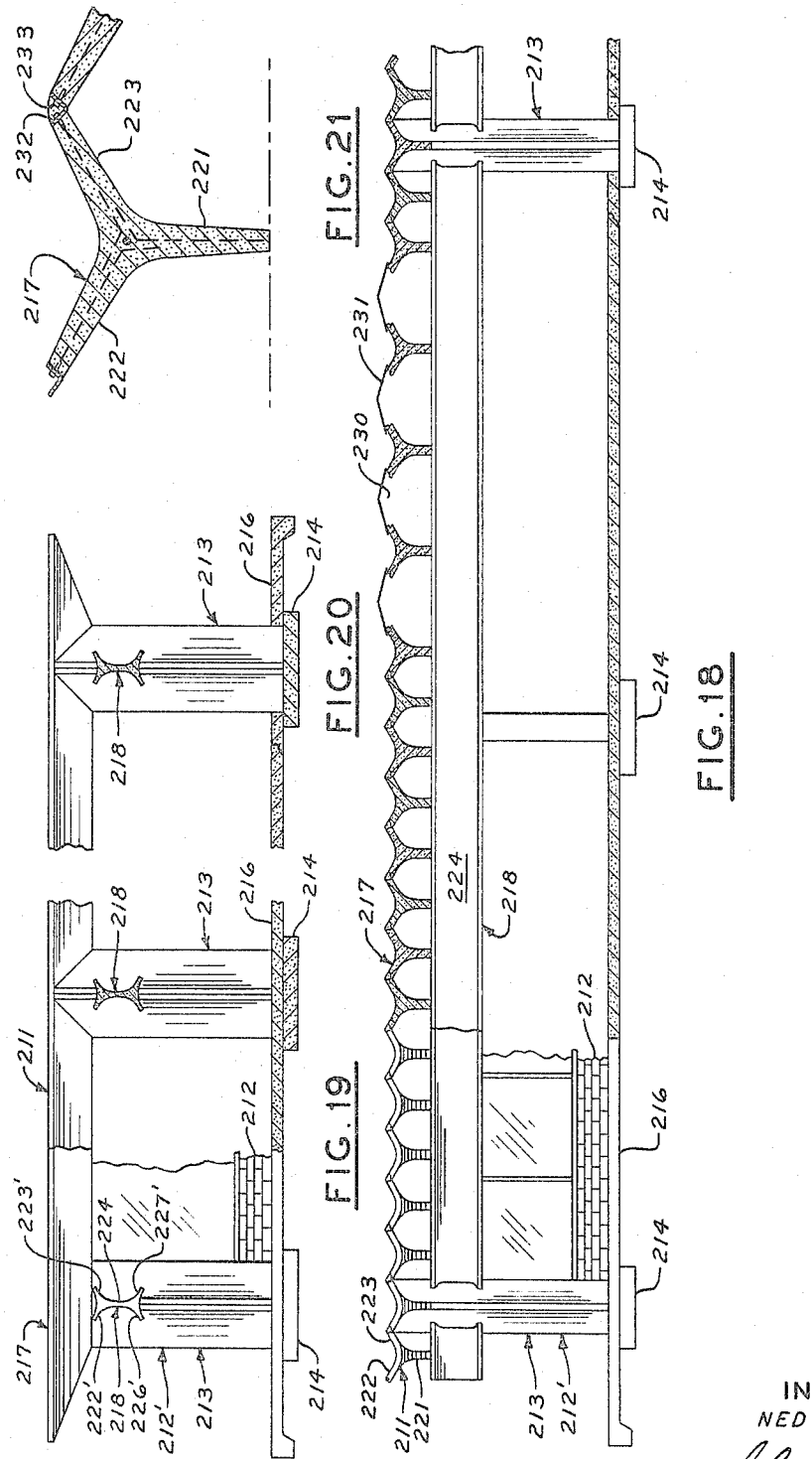

Dec. 6, 1966  N. H. ABRAMS  3,289,366
STRUCTURAL MEMBERS AND STRUCTURES
Filed Jan. 2, 1962  10 Sheets-Sheet 8

INVENTOR
NED H. ABRAMS
BY Arlington White
ATTORNEY ited States Patent Office 3,289,366
Patented Dec. 6, 1966

3,289,366
STRUCTURAL MEMBERS AND STRUCTURES
Ned H. Abrams, 575 Britton Ave., Sunnyvale, Calif.
Filed Jan. 2, 1962, Ser. No. 163,446
14 Claims. (Cl. 52—174)

The invention, in general, relates to the construction art and more particularly relates to reinforced concrete members and structures having such reinforced concrete members as components thereof.

My present invention constitutes an improvement upon the Reinforced Concrete Bin Structure disclosed and claimed in United States Letters Patent, No. 2,746,283, granted to me on May 22, 1956.

While it is within the purview of the present improvement that my hereinafter disclosed and claimed structural members can be formed with suitable molds and untreated or conventional concrete, I preferably form my improved structural members by vacuum concrete methods with the reinforcing members thereof prestressed and the units cast-in-situ in a horizontal position, wherever space permits, for subsequent elevation on the site to their appropriate and predetermined locations in any given structure.

A primary object of my present invention is to provide structural members of reinforced concrete which not only lend strength, rigidity and stability to structures of which they are components but also which afford construction economy.

Another important object of the invention is to provide reinforced concrete structural members of the indicated nature which are additionally characterized by their flexibility of application in a wide variety of different types of structures, and by their inherent capability of affording expandability to structures both horizontally and vertically.

A still further object of my invention is to provide an improved reinforced concrete structural member of the aforementioned character which is especially suitable to vacuum concrete processing and thus reduces to a minimum its cost of manufacture.

Another important object of my present invention is to provide improved structures of increased strength and stability and of ready expandability in at least two directions without sacrificing either strength or stability.

A still further object of the invention is to provide improved structures of the indicated nature which are additionally characterized by the incorporation therein of structural members of prestressed and precast reinforced concrete which lend themselves admirably to pre-tensioning as well as post-tensioning.

Other objects of the invention, together with some of the advantageous features thereof, will appear from the following description of a preferred embodiment as well as certain modified embodiments of my invention in structural members and structures embodying the same. It is to be understood, however, that I am not to be limited to the precise embodiments illustrated, nor to the precise arrangement of the various components or elements thereof, as my invention, as defined in the appended claims, can be embodied in a plurality and variety of forms and carried out in a plurality and variety of ways.

Referring to the drawings:

FIG. 1 is a fragmentary plan view of a preferred embodiment of my improved structure, as exemplified in a grain elevator, fashioned into a plurality of hexagonal shaped bins, and incorporating preferred embodiments of the structural member of the present invention; this view showing the structure from left to right at different levels thereof.

FIG. 2 is a fragmentary elevational view of the structure shown in FIG. 1 and taken on the line 2—2 thereof.

FIG. 3 is another fragmentary elevational view of the structure shown in FIG. 1 but taken on the line 3—3 thereof.

FIG. 4 is still another fragmentary elevational view of the structure of FIG. 1 this view being taken on a line 4—4 of FIG. 1.

FIG. 5 is a still further fragmentary elevational view of the structure shown in FIG. 1 and taken on the line 5—5 thereof.

Figure 7:
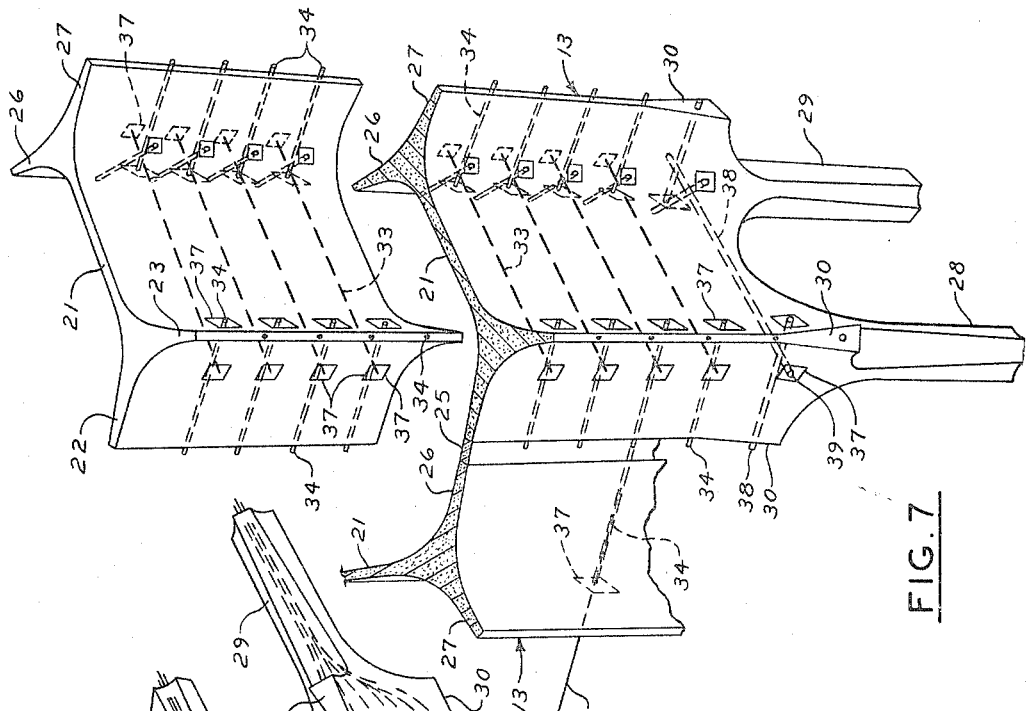

FIG. 7 is a broken elevational perspective view of my improved structural member in an erect position for incorporation in a structure; this view showing in dotted lines as well as dot and dash lines the reinforcing elements longitudinally thereof which are prestressed prior to the setting of the concrete and also showing the transversely extending reinforcing elements which are post-tensioned after the concrete has been formed and also which are post-tensioned after the structure has been erected and placed in operative position.

FIG. 8 is a fragmentary top plan view of the bin tops of the structure of FIG. 1 parts being broken away to illustrate the means for fastening the tops together.

FIG. 9 is an enlarged sectional detail of a portion of the showing of FIG. 8 and taken on the line 9—9 thereof.

FIG. 10 is a fragmentary plan view of a joint between structural members at the bin tops of the structure of FIG. 1.

FIG. 11 is an enlarged elevational sectional view taken on the line 11—11 of FIG. 10.

FIG. 12 is a sectional elevational view taken on the line 12—12 of FIG. 8.

FIG. 13 is a fragmentary plan view taken at a midpoint level of the bin structure of FIG. 1.

Figure 14:
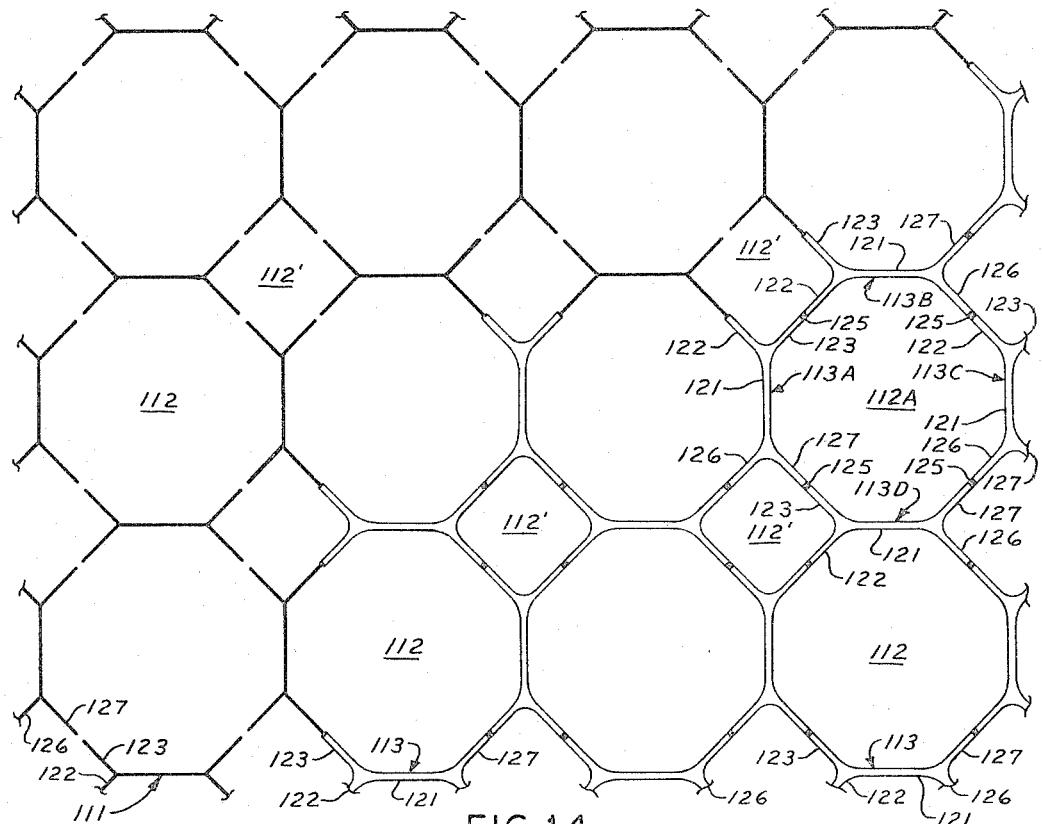

FIG. 14 is a schematic plan view of a modified embodiment of the improved structure of the present invention incorporating modified embodiments of the structural member of the present invention.

Figure 15:
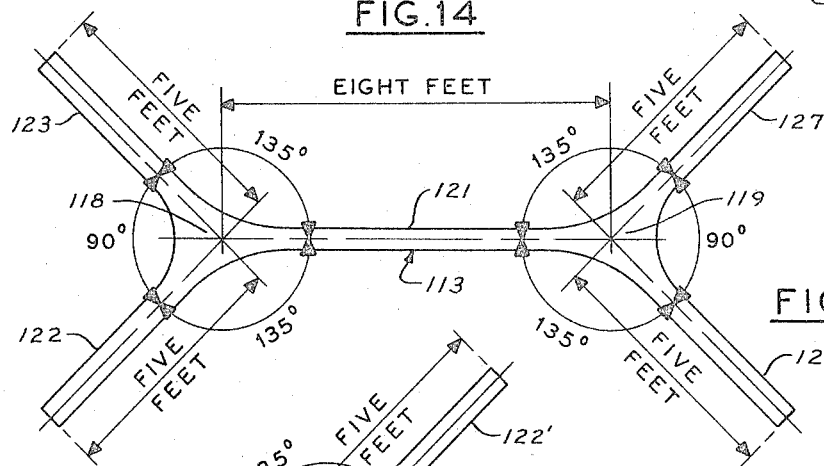

FIG. 15 is a plan view of a modified embodiment of the structural member of my invention.

Figure 16:
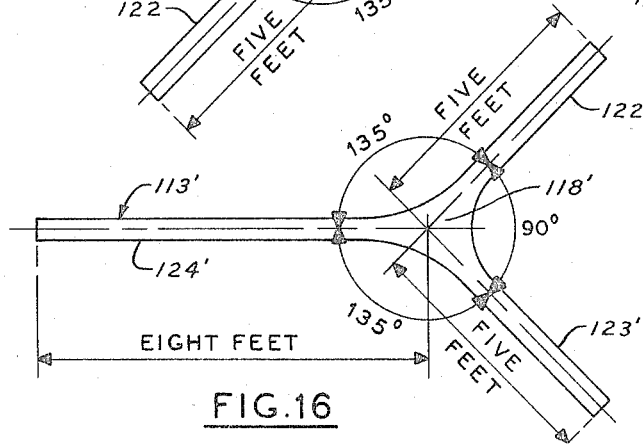

FIG. 16 is a plan view of another modified embodiment of a structural member of the present invention.

Figure 17:
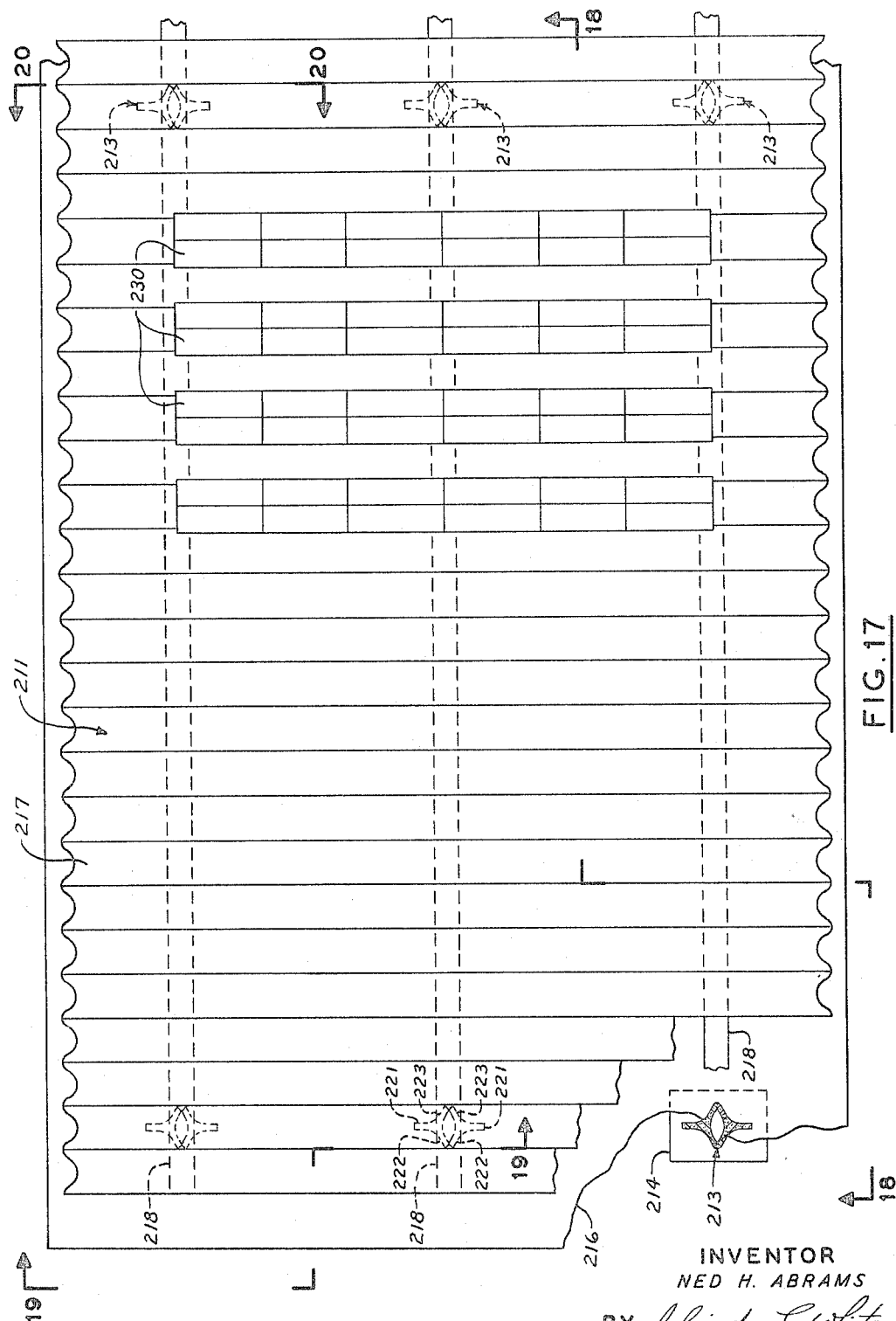

FIG. 17 is a fragmentary plan view of a preferred embodiment of a roof structure for incorporation in buildings containing my improved structural members as components thereof, both exemplified in structural beams and columns; this view also illustrating skylights in the roof structure.

FIG. 18 is a sectional elevational view taken on the line 18—18 of FIG. 17.

FIG. 19 is a sectional elevational view taken on the line 19—19 of FIG. 17.

FIG. 20 is a sectional elevational view taken on the line 20—20 of FIG. 17.

FIG. 21 is an enlarged detail of one of the structural members forming a component of the structure illustrated in FIG. 17 together with a detail in fragmentary form of a connected contiguous structural member.

Figure 22:
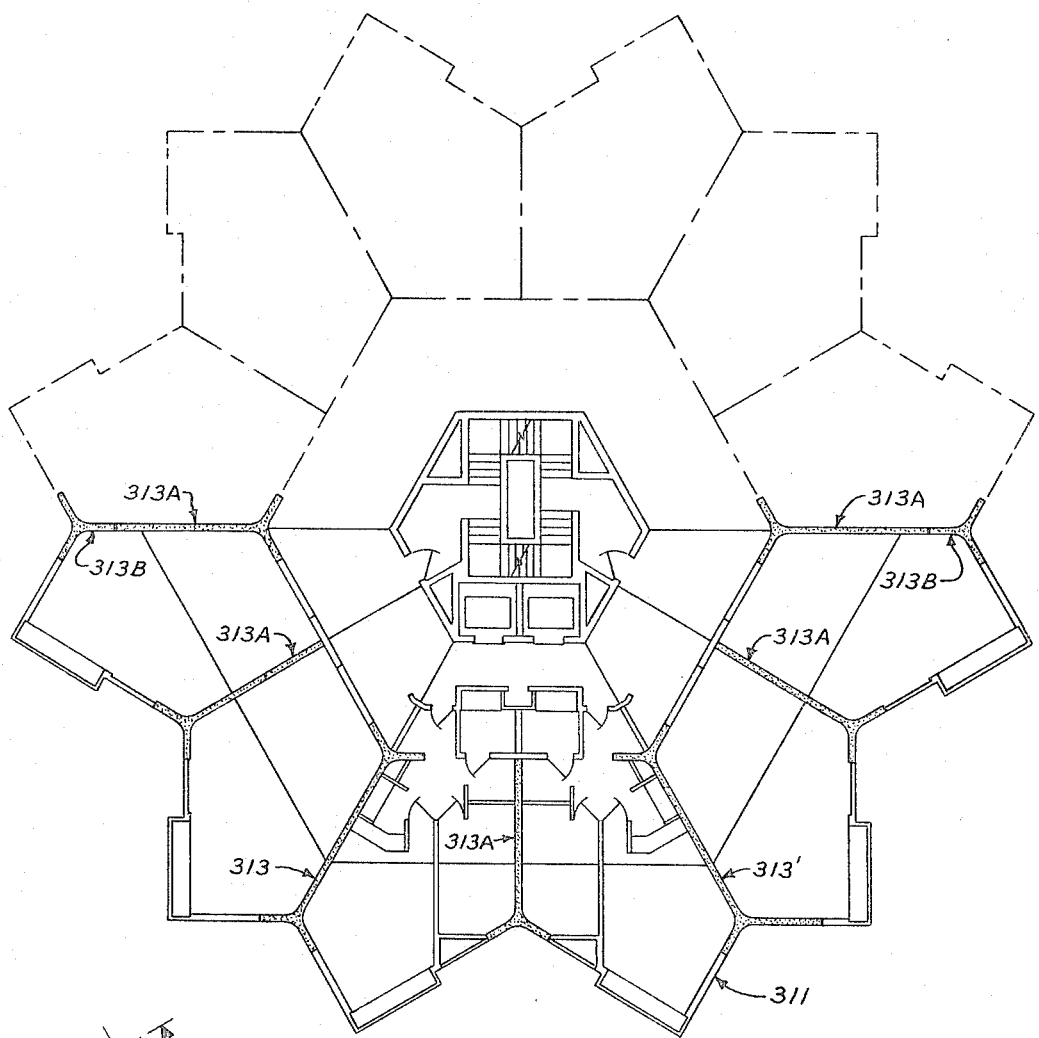

FIG. 22 is a plan view at one level of an improved structure of my present invention, as exemplified in an apartment dwelling, and incorporating the preferred as well as modified embodiments of the improved structural members of my present invention.

Figure 23:
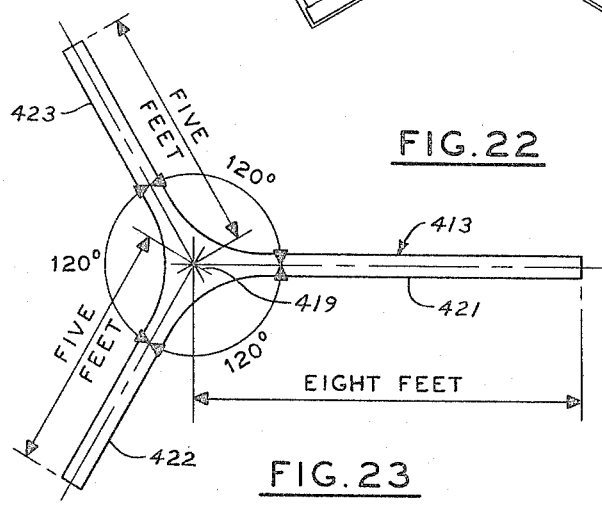

FIG. 23 is a plan view of still another modified embodiment of my improved structural member.

Figure 24:
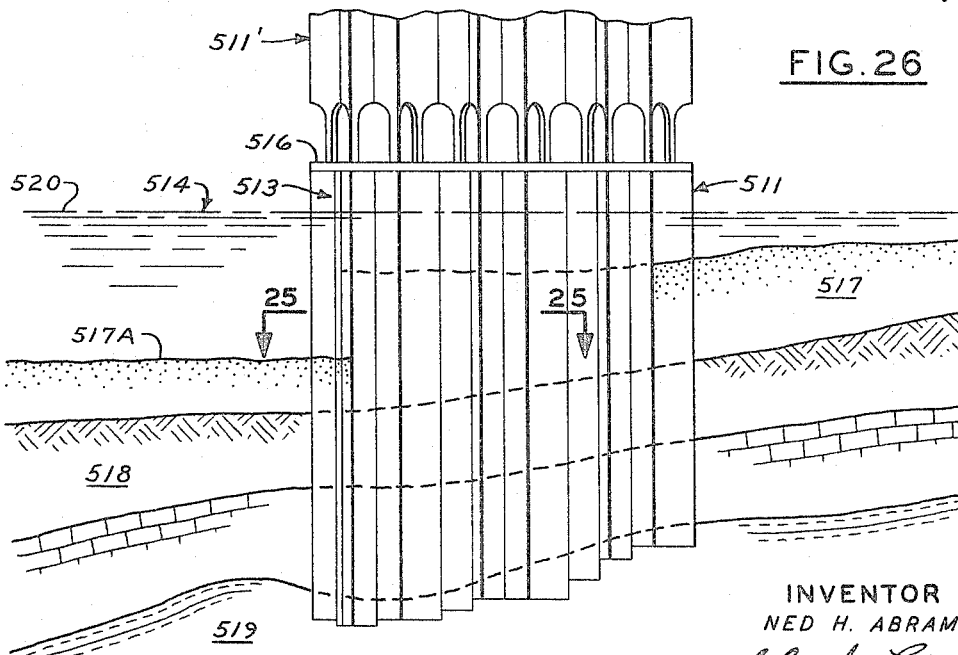

FIG. 24 is a sectional elevational view of a still further modification of the present invention, as exemplified in a pile and piling structure; this view showing in fragmentary elevation a typical superstructure supported by the pilings.

Figure 25:
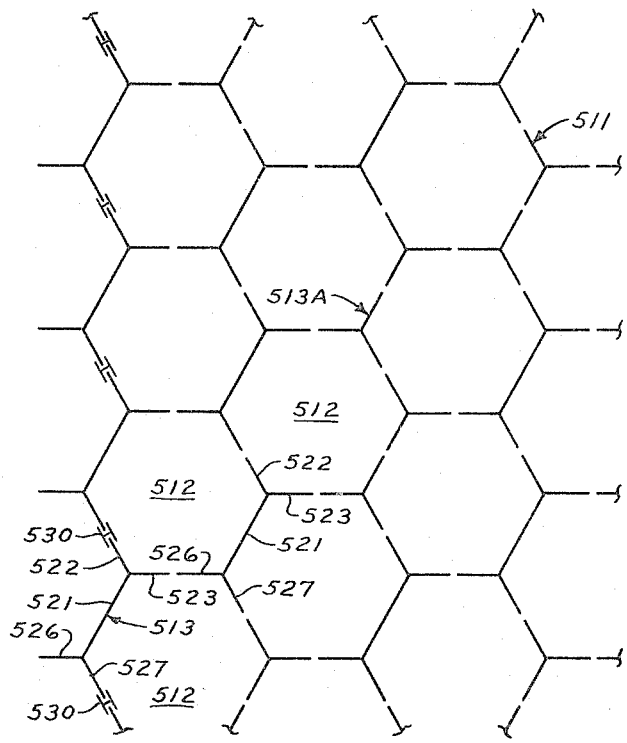

FIG. 25 is a schematic plan view of the modification of FIG. 24, this view being taken in the direction of the arrows 25—25 of FIG. 24.

Figure 26:
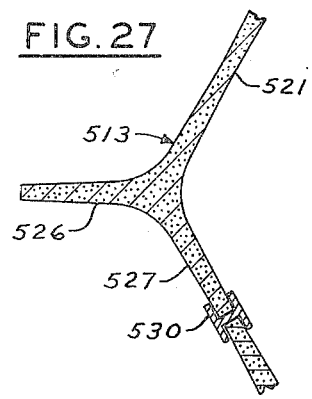

FIG. 26 is an enlarged detail of two adjacent piles of the structure of FIG. 25 illustrating a joint therebetween.

Figure 27:
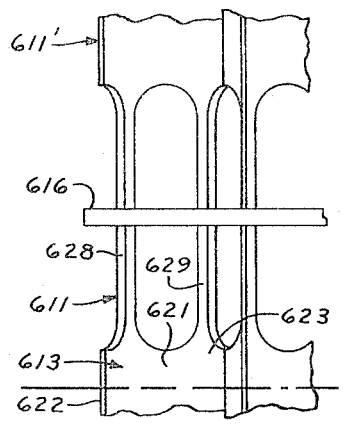

FIG. 27 is a fragmentary sectional elevational view of another exemplification of a pile and pile structure embodying a modification of the present invention.

Figure 28:
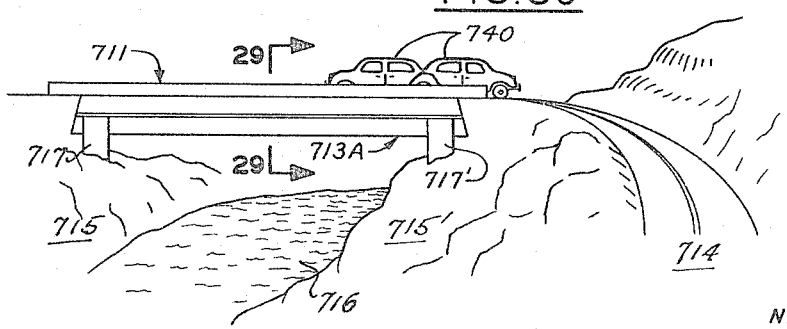

FIG. 28 is an elevational view of still another modification of my present invention, as exemplified in a bridge structure incorporating the preferred embodiment of my invention in an improved structural member.

Figure 29:
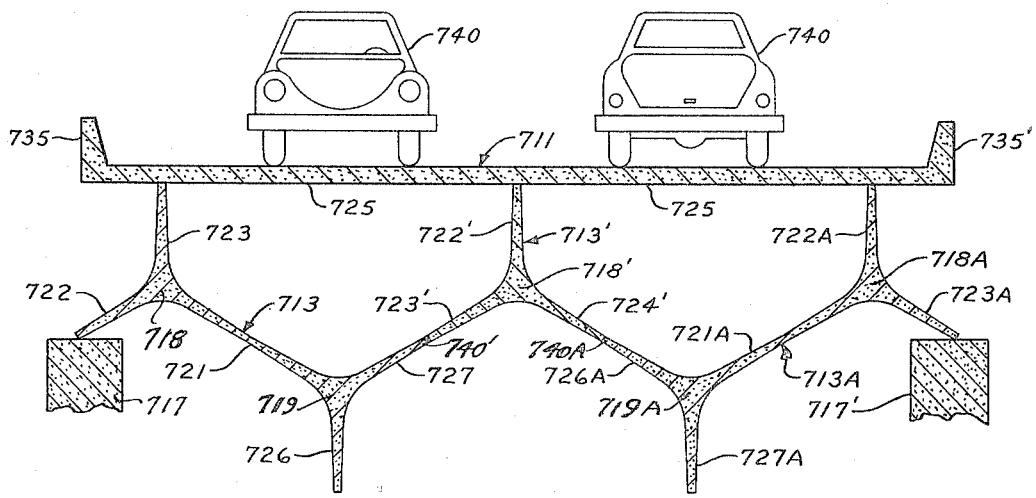

FIG. 29 is a sectional elevational view of the modification of FIG. 28 and taken on the line 29—29 thereof.

Figure 30:
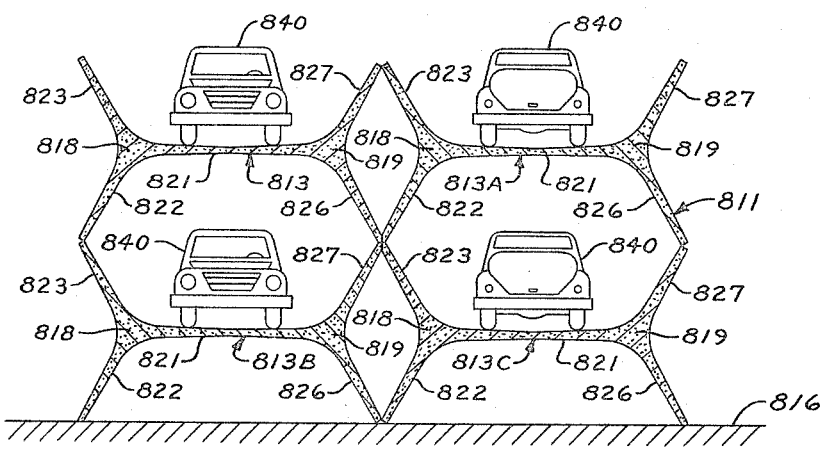

FIG. 30 is a view similar to FIG. 29 but showing a slightly different modification than FIGS. 28 and 29 and illustrating another horizontal application of the preferred embodiment of my invention in improved structural members.

In its preferred form, the reinforced concrete symmetrical structural member of my present invention preferably comprises a pair of hub sections of equal length in spaced relationship to one another with their longitudinal axes in parallel relationship, a web spanning said hub sections at substantially a right angle to the longitudinal axes of said hub sections, wings of equal length and width on each of said hub sections extending parallel to the axes thereof and radially therefrom and in equal angularly spaced relationship to said web as well as in equal angularly spaced relationship to one another, haunches on the opposite sides and adjacent to one longitudinal extremity of each of said wings and said web, together with a pair of legs protruding in spaced relationship to one another at one end of the structural member and constituting converging extensions of said wings and said web at its junctures with said wings, a plurality of prestressed reinforcing elements extending longitudinally of and embedded in said web and in each of said wings and in each of said legs, a plurality of prestressed reinforcing members extending transversely of and embedded in spaced relationship in said web; said transversely disposed reinforcing members in said web being adapted to be post-tensioned, and a plurality of conduits extending transversely of and embedded in spaced relationship in each of said wings for the reception of reinforcing rods which are adapted to be post-tensioned.

A modified embodiment of my improved reinforced concrete structural member comprises the components of the preferred embodiment except that the angular relationship between the web and the wings on said hub sections is unequal to render the structural member angularly asymmetrical.

A still further modification of my present invention in a reinforced concrete asymmetrical structural member preferably comprises a hub section, three wings on said hub section extending parallel to the axis thereof and radially therefrom with the angular relationship between said wings unequal, haunches on the opposite sides and adjacent to one longitudinal extremity of each of said wings, a leg protruding from one end of the structural member and constituting a converging extension of said wings, together with a plurality of prestressed reinforcing elements extending longitudinally of and embedded in said wings and said leg, and a plurality of conduits extending transversely of and embedded in spaced relationship in each of said wings for the reception of reinforcing rods which are adapted to be post-tensioned.

Another modified embodiment of my present invention, as exemplified in a reinforced concrete asymmetrical structural member, preferably comprises a hub section, three wings on said hub section extending parallel to the axis thereof and radially therefrom, at least one wing of said three wings being of greater width than the others of said three wings, a haunch on opposite sides of and adjacent to one longitudinal extremity of said wings, together with a plurality of prestressed reinforcing elements extending longitudinally of said wings, and a plurality of conduits extending transversely of and embedded in spaced relationship in each of said wings for the reception of reinforcing rods which are adapted to be post-tensioned.

A preferred embodiment of my improved reinforced concrete structure, as exemplified in a grain elevator having a plurality of bins therein of hexagonal cross-section which are arranged in a honeycomb pattern, preferably comprises a plurality of united precast reinforced concrete structural members of my preferred embodiment hereinabove described defining the vertical walls of the bins, together with a bin bottom supported on said haunches of the bounding structural members of each of said bins, and a top closure overlying said bins and connected to the tops of said plurality of structural members; said tops having a plurality of openings communicating with said bins for filling the same with grain.

A modified embodiment of my invention in a reinforced concrete structure, as exemplified in a grain elevator having a plurality of grain-receiving bins therein in excess of sixteen bins of octagonal cross-section, together with a plurality of rectangular shaped bins of smaller dimensions as interstitial blending bins between every four otherwise contiguous bins, preferably comprises a plurality of reinforced concrete structural members described hereinabove as a modified embodiment and wherein the angularly asymmetrical form of said structural members consists of a right angle between each pair of adjacent wings on each of said hub sections, and angles of 135° each between the web and the adjacent wing on each of said hub sections; said modified embodiments of my improved reinforced concrete structural member constituting the vertical walls of said grain bins of octagonal cross-section with one wing on each hub section constituting one-half of one wall of each of said interstitial blending bins.

A still further modification of my improved reinforced concrete structure, as exemplified in a roof component, preferably comprises a first plurality of the preferred embodiment of my aforesaid angularly symmetrical structural members as hereinabove defined, arranged with the webs thereof in horizontal parallel relationship and with a wing on one structural member of each of said plurality of structural members in abutting relation with and connected to a wing of a contiguous structural member of said first plurality of structural members, together with a second plurality of my aforesaid angularly symmetrical structural members arranged in spaced relationship to one another with their webs vertically disposed and their wings engaging the bottoms of said webs of said horizontally arranged structural members of said first plurality of structural members to support the roof component as an entity.

Another modified embodiment of my improved reinforced concrete structure, as exemplified in a multi-floor apartment house having a plurality of apartments on each floor thereof which are of variable cross-section including oval, circular, rectangular and square, preferably comprises a plurality of my preferred embodiment of symmetrical structural members as hereinabove described united together in arrangements to define some of the vertical walls and studding and columns for the apartments on each floor of said apartment house, together with a plurality of my modified embodiment of asymmetrical structural members as hereinabove defined and constituting some of the vertical walls and columns of still other apartments of said apartment house, and a plurality of my preferred embodiment of symmetrical structural members disposed in horizontal positions and constituting beams for supporting floors as well as roof sections of the apartments of said apartment house.

A still further modification of the present invention, as exemplified in pilings and a pile structure, preferably comprises a plurality of angularly symmetrical precast reinforced concrete structural members each preferably consisting of a pair of hub sections in spaced relationship to one another, a web spanning said pair of hub sections, and a pair of wings on each of said hub sections extending radially therefrom in spaced relationship to one another; said plurality of angularly symmetrical precast reinforced concrete structural members being disposed vertically and adjacent to one another with wings thereof in contiguous relationship in a sub-soil and with the bottom surfaces of said pair of wings on one hub section of said pair of hub sections seated on a foundation within said sub-soil and the top surfaces of said pair of wings on said other hub section lying substantially coplanar in a horizontal plane above the surface of said sub-soil, reinforced concrete joints connecting together contiguous wings of said plurality of structural members; said joined plurality of structural members defining and bounding a plurality of interstitial spaces to confine and retain the subsoil against shifting, and at least one reinforced precast concrete slab seated upon the top coplanar surfaces of said wings of said plurality of reinforced concrete structural members in a horizontal plane above said sub-soil.

Another modification of the present invention, as exemplified in a pile structure comprises the aforesaid piling structure, except that a pair of legs are provided on each of said symmetrical precast reinforced concrete structural members extending from one end thereof with the upper surfaces of said legs, rather than the top surfaces of said pair of wings of each of said structural members lying coplanar in a substantially horizontal plane, and that the reinforced concrete slab seats on said upper surfaces of said legs rather than upon the coplanar top surfaces of said wings.

A still further modification of the present invention, as exemplified in a generally horizontally disposed bridge structure embodying my improved angularly symmetrical structural members, preferably comprises a first plurality of angularly symmetrical precast reinforced concrete structural members each consisting of a first hub section, a second hub section of equal length to said first hub section and arranged in spaced relationship thereto with the longitudinal axes of said hub sections substantially parallel to one another, a web spanning said first hub section and said second hub section, a first wing on said first hub section, a second wing on said first hub section, a third wing on said second hub section and a fourth wing on said second hub section; all of said wings extending parallel to the axes of said hub sections and extending radially therefrom on opposite sides of said web in pairs, said first plurality of structural members being arranged in spaced relationship to one another whereby said first wing and said third wing lie substantially in a vertical plane, one or more angularly symmetrical structural members consisting of a single hub section, and a first wing and a second wing and a third wing on said single hub section extending radially therefrom; said one or more plurality of structural members being arranged in alternation with said first plurality of angularly symmetrical structural members with said first wing of said one or more plurality of structural members being disposed vertically and said second wing and said third wing of said one or more structural members being connected to and in alignment with the fourth wing of adjacently disposed second hub sections of said first plurality of precast reinforced concrete structural members, at least one reinforced concrete slab seated upon the upper surfaces of said first wings of said first plurality of reinforced concrete structural members and said one or more structural members which are all supported in substantially a horizontal plane coplanar to all of said upper surfaces, and a plurality of buttresses supporting said third wings of said first plurality of structural members so that said first wings lie substantially vertical with their upper surfaces in substantially a horizontal plane coplanar to all of said surfaces.

Another modification of the present invention, as defined in a multi-level bridge structure having substantially horizontal roadways over which vehicles may pass, preferably comprises a plurality of angularly symmetrical precast reinforced concrete structural members arranged in folded plate relationship with one another and defining a first group of angularly symmetrical precast reinforced concrete structural members arranged contiguous to one another with their webs lying substantially horizontal and coplanar but in spaced relationship with one another, and a second group of said angularly symmetrical precast reinforced concrete structural members arranged contiguous to one another with webs lying in a horizontal plane and substantially coplanar with one another but in vertically spaced relationship to the horizontally disposed webs of said first group of said precast reinforced concrete structural members; said spaced but horizontally disposed webs of said first group of structural members and said horizontally disposed webs of said second group of structural members each defining a roadway for the passage of vehicles thereover, and a plurality of buttresses underlying the wings projecting below the horizontally disposed webs of said second group of structural members to maintain all of said structural members in static equilibrium with the webs of said structural members disposed in horizontal planes as aforesaid.

With specific reference to a grain elevator structure containing bins of hexagonal cross-section, I have illustrated a preferred embodiment of such grain elevator, which is designated generally by the reference numeral 11, in FIG. 1 of the annexed drawings in schematic plan with some of the bins thereof, designated by the reference numeral 12, in fragmentary view and other of the grain bins 12 fully bounded or enclosed. The showing of FIG. 1, from left to right, is fragmentary at different levels from the bottom to the top and, as shown, it will be observed that I employ my improved structural member, designated generally by the reference numeral 13 and shown more particularly in FIGS. 6 and 7, as principal components of the structure with the improved structural members 13 constituting and defining the bounding vertical walls of each of the bins 12. As hereinafter more particularly delineated, each of the structural members 13 will be prestressed, precast reinforced concrete, varying in height to accommodate the height of container or grain elevator required. The lower portions or each of the structural members will be formed into and serve as columns, designated generally by the reference numeral 14 at the left side of FIG. 1 of the annexed drawings which indicates in short and long dash lines the outlines of the grain bins at the lower level of the grain elevator structure. It is to be understood that where the soil or under surface of the structure requires unquestionably adequate foundations, it is within the purview of this invention that the structural members 13 of the grain elevator shown will be supported either on drilled piers, not shown, or upon a concrete slab base 16 which is shown in FIGS. 2 and 3 of the accompanying drawings. Suitable angle clips 17 may be utilized to tie the structural members 13 at the bottoms of the columns 14 thereof to the base 16, all in the customary manner. Moreover, and as particularly illustrated in FIGS. 24–27 inclusive, hereinafter described, the structural members shown in FIG. 1 and detailed in FIGS. 6 and 7, may be utilized in inverted form as pilings, with or without the legs thereon.

Figure 6:
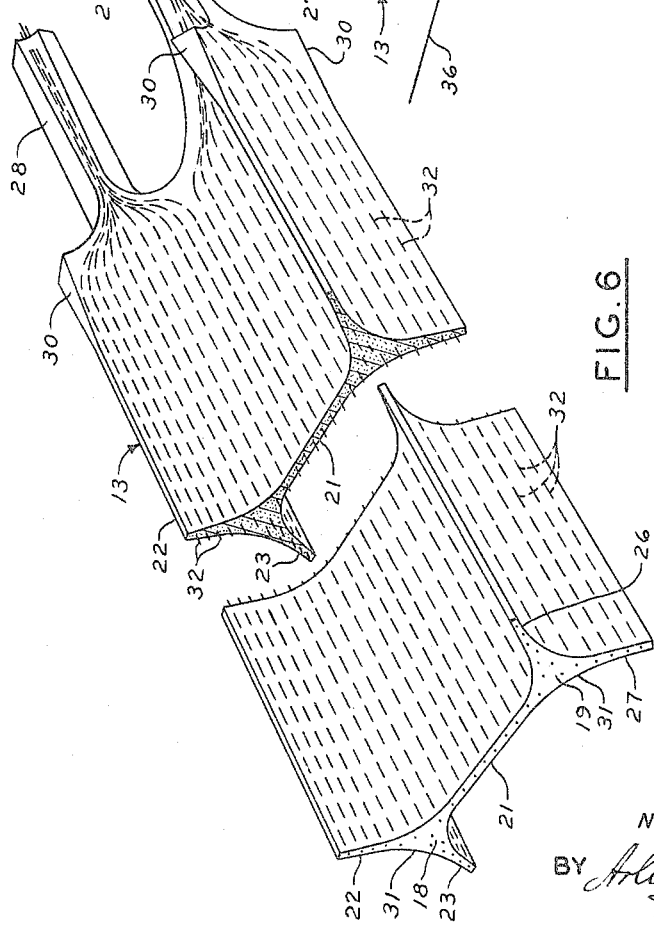
FIG. 6 is a broken horizontal perspective view of a preferred embodiment of my improved structural member at the completion of precasting thereof and in condition to be raised to operative position in a structure.

In accordance with my present invention, all of the preferred embodiments of the structural members 13 are preferably so formed as to provide therein a pair of hub sections 18 and 19, which are spaced from one another a predetermined distance depending upon the size of hexagonal bin 12 desired in any given grain elevator structure 11, and an integral web 21 spanning the two hub sections 18, 19. Moreover, each structural member 13 of my preferred embodiment for use as a structural component of the grain elevator 11 depicted in FIGS. 1–5 inclusive, having cells or grain bins 12 therein of hexagonal cross-section, preferably includes two wings 22, 23 and 26, 27 on each of the hub sections 18 and 19, respectively, with such wings 22, 23 and 26, 27 extending parallel to the axes of the hub sections 18 and 19 and radially therefrom in equal angularly spaced relationship to said web 21 as well as at equal angularly spaced relationship to one another. Thus, for a symmetrical honeycomb pattern of grain bins 12 of hexagonal cross-section contained in my improved grain elevator 11, the precast reinforced concrete structural members 13 thereof are so formed that the angle between the axis of each of the wings 22 and 23 on hub section 18 is 120°; the angle between the axis of the wing 22 and the axis of the web 21 is 120°; and the angle between the axis of the wing 23 and the axis of the web 21 is 120°. Similarly, the angle between the axes of the wings 26 and 27 on hub section 19 is 120°; the angle between the axes of the wing 26 and the axis of the web 21 is 120°; and the angle between the axis of the wing 27 and the axis of the web 21 is 120°. As will more particularly hereinafter appear, my modified structure, as exemplified in a grain elevator containing bins of octagonal cross-section, incorporates modified embodiments of my improved structural member formed asymmetrically insofar as the angular relationships between the wings thereof as well as between the wings and the webs thereof are concerned. In my preferred embodiment of my improved structural member 13, the wings 22, 23, 26 and 27 are all formed to an equal width and of equal length, the lengths being coextensive with the equal lengths of the hub sections 18 and 19 so that when erected and positioned in the structure 11 the walls of the cells or bins 12 will be uniform in height. In addition to the foregoing, it will be observed that I preferably form each of the preferred embodiments of my improved structural member 13 with a pair of legs 28 and 29 thereon, which protrude from one end thereof, as shown in FIGS. 6 and 7 and which constitute converging extensions of the wings 22, 23, 26 and 27 as well as the web 21 at the portions thereof which form junctures with such wings. Moreover, each of the structural members 13 is so formed as to provide a haunch 30 on each side of the web 21 and each side of each of the wings 22, 23, 26 and 27 adjacent to the extremities thereof from which the legs 28 and 29 protrude; such haunches 30 being tapered and diverging toward the legs 28 and 29. To afford increased strength and sufficient thicknesses of the structural members 13 for effectively post-tensioning contained reinforcing members, I preferably form deep arcuate junctures, as at 31, between the wings 22, 23, 26 and 27 and the hub sections 18 and 19, respectively, thereby providing additional concrete at such junctures for the post-tensioning plates, hereinafter described.

While the structural members 13 of my present invention may be cast in any desired manner, I preferably form or cast these members in horizontal positions, preferably although not necessarily utilizing vacuum concrete processes, on or adjacent to the site of erection of the structure which will incorporate such structural members. As shown in FIG. 7, each structural member 13 is cast with a plurality of reinforcing elements 32 embedded therein, in spaced relationship to one another and extending longitudinally of the web 21 and of the wings 22, 23, 26 and 27; such reinforcing wires or elements 32 being initially supported on suitable jacks, not shown, which may be equipped with hydraulic gauges or the like, where they are prestressed with conventional prestressing mechanisms, all not shown, to the desired tension as indicated on the gauges, all prior to the pouring of the concrete into the provided forms.

The precast prestressed reinforced concrete structural member 13 of the present invention also includes a plurality of reinforcing members 33 which conveniently may be in the form of greased steel rods and which may be suitably supported in spaced parallel relationship to one another transversely of the web 21 in spaced apart template holes, not shown, fashioned in the provided forms. In addition, my improved precast prestressed reinforced concrete structural member 13 includes a plurality of conduits 34 which are embedded in the structure in spaced parallel relationship to one another transversely of the wings 22, 23, and 26, 27 on the hub sections 18 and 19, respectively, of the structural member; such conduits 34 conveniently being initially supported in operative positions by means of suitably spaced template holes in the provided forms, all not shown, all prior to the pouring of the concrete; the conduits 34 serving to receive suitable reinforcing rods 36, see also FIGS. 1, 2 and 3, which are post-tensioned in situ when the structural members 13 are placed in operative positions in the structure being erected, by means of conventional post-tensioning plates 37 and standard post-tensioning mechanisms and methods. Moreover, in order to afford the desired strength, I preferably provide a relatively large single conduit 38 in each structural member 13 at the approximate center of mass of the structural members adjacent to the haunches 30 thereof, in a manner similar to the placement of the conduits 34 and prior to the pouring of the concrete, so that the conduit 38 is embedded in the structural member 13 at the location indicated for receiving a relatively large reinforcing rod or member 39, which likewise is preferably post-tensioned in situ after the structural members 13 are raised and disposed in their operative positions in the structure being erected.

In accordance with the present invention, as exemplified in an improved grain elevator structure containing bins of hexagonal cross-section, each of the bins 12 is closed at the bottom thereof with a precast reinforced concrete bottom, which is generally designated in the annexed drawings by the reference numeral 41, and is closed at the top thereof with a precast reinforced concrete top, generally designated by the reference numeral 42. All of the bin bottoms and bin tops can be conveniently precast in a secondary area of the site on which the improved grain elevator structure of my present invention is to be erected, closely adjacent to the casting site of the structural members 13 or the stock-pile thereof. As particularly shown in FIGS. 1, 2 and 3, each of the bin bottoms 41 is cast to a generally cone shape with its base 43 of hexagonal shape to correspond to the hexagonal cross-section of each bin 12, the bases of the bin bottoms resting or being seated upon the haunches 30 of the bounding structural members 13 of each bin. As shown, the bin bottoms 41 are relatively deep in vertical cross-section for increased strength for supporting a load of grain but in order to reduce the weight thereof the bin bottoms may be cast with a relatively hollow base strengthened by webs 44 radially extending from a center position 46, which defines the bin discharge opening 47, to the perimetrical foot or base 43 in spaced relationship to one another. While not shown in the accompanying drawings, a conventional pivotally mounted closure is provided for sealing the discharge opening 47 of each bin bottom. A plurality of suitable reinforcing rods or elements 48 are disposed in spaced relationship to one another on the forms employed to fashion the bin bottoms, prior to pouring of the concrete, so that such reinforcing elements are partially embedded in the concrete bin bottoms and partially project therefrom, see FIG. 2, for integrating with partially projecting reinforcing elements from adjacent bin bottoms during the uniting of the adjacently disposed bin bottoms at the time of erection of structure 11, all in the conventional manner.

In a similar fashion, the concrete bin tops 42 are precast as large hexagonal but relatively thin flat slabs containing a depending perimetrical foot 53 of hexagonal shape for seating upon the flanges of a hanger member, hereinafter described, whereby each bin top is initially supported in operative position as a closure for a bin 12. Each cast bin top 42 is so fashioned as to afford a relatively light-weight construction and to this end the under side of the top is hollow in sections as defined by a plurality of struts 54 radially extending in spaced relationship to one another from a central hollow boss 56 to the perimetrical foot 53 of the bin top. In order to facilitate the rapid filling of each bin 12, I preferably form each of the bin tops 42 with a pair of radially arranged relatively large manholes and spout orifices 57 and 57', but offset from the center of each hexagonal slab, as shown in FIG. 1. These spout orifices and manholes can be so disposed, when the bin tops 42 are placed in operative positions, that adjacent bin tops 42 will present such manholes and spout orifices 57 and 57' in close relationship to one another thus facilitating the delivery of grain to the bins from loading spouts, not shown. To provide increased strength, suitable reinforcing rods 58 are precast in each bin top with portions of such reinforcing elements projecting laterally therefrom for uniting with laterally extending similar reinforcing rods 58 of an adjacent bin top 42 during the erection of the grain elevator 11.

Summarizing the foregoing preliminary steps toward the erection of a preferred embodiment of my improved structure 11, as exemplified in a multi-bin grain elevator containing bins 12 of hexagonal cross-section, precasting areas are first selected at the site of the structure to be erected for laying out the requisite forms for fashioning the requisite number of the preferred embodiment of my present invention in a precast prestressed reinforced concrete structural member 13, and for laying out the requisite forms for fashioning the precast reinforced bin bottoms 41 and the precast reinforced bin tops 42. All of these reinforced structural members and structural components of the grain elevator 11 are cast-in-situ, preferably but not necessarily, as stated above, utilizing vacuum processing to effect rapid and efficacious curing of the concrete. After the structural members 13 have been poured and removed from the base forms, they can readily be stock-piled alongside of the building site, and they preferably are laid in rows so that they easily may be raised by a crane from the stock-pile area and moved to their locations in the grain elevator structure 11, without additional transportation.

The erection of the structural members 13 as components of the structure 11 can be readily accomplished. Initially, a bin bottom 41 is first located and supported on a temporary platform at the proper elevation, and secured thereto. Then, three structural members 13 are raised by the crane, one at a time, and bolted to the bin bottom 41 at spaced intervals thereabout, and secured by means of the angle clips 17 and suitable screw bolts, to the floor 16 of the structure in upright position, and the first three structural members then temporarily tied together adjacent to their tops by any suitable means, such as steel cables, not shown. When three structural members 13 have been so placed, the structure 11 will be stable thenceforth. Thereafter, an additional three structural members 13 of my preferred embodiment are erected by the crane one at a time and similarly bolted to the initial bin bottom 41 at spaced intervals thereabout, thus making a continuous cell 12 of such structural members 13, all as depicted in FIG. 1 of the annexed drawings. It is to be understood, and as clearly illustrated, that portions of each of the structural members 13 bounding any given bin or cell 12 of the structure 11 will constitute also a part of the bounding wall of an adjacent bin 12. Thus, and referring to the bin marked 12A at the center of FIG. 1, a structural member which is marked 13A serves as one complete bounding wall for cell 12A as well as approximately one-half parts 13A' and 13A" of the adjacent walls of cell 12A. Further, the structural member marked 13A serves as one complete bounding wall for an adjacent cell 12B as well as parts 12B' and 12B" of adjacent bounding walls of such cell 12B. An additional structural member, designated by the reference numeral 13B has one wing thereof marked 13B' serving, by connection with the part 13A" of member 13A, as the remaining part of a bounding wall of cell 12A, and has another wing marked 12B" serving as one-half an adjacent bounding wall of cell 12A; such structural member 13B having its web serving as one complete bounding wall of the two adjacent bins marked 12C and 12D, with its wings 13B' and 13B" serving as one-half of adjacent bounding walls of the adjacent bins 12C and 12D, respectively. The remaining bounding walls of each of the continuous bins 12A, 12B, 12C, 12D, etc.; each formed in part by six structural members 13 of my preferred embodiment, as illustrated in FIGS. 6 and 7, can be similarly traced throughout the entire structure 11.

Upon the bolting of the structural members 13 to the bin bottoms 41, including at least two locations per haunch 30 of the members 13, the bin tops 42 are positioned and secured. To this end, I provide and bolt a hanger plate 61 on and to the top of each structural member 13, preferably at the joints, hereinafter described, between adjacently disposed wings of adjacently placed structural members 13; each hanger plate including laterally projecting flanges 62 and 63 extending on opposite sides of the structural members for supporting at four places the perimetrical foot 53 of adjacently disposed bin tops 42. The placement of the bin tops 42, coupled with the bolting of each structural member 13 not only to the base 16 of the structure 11 but also to bin bottoms on all sides thereof, holds all structural members 13 rigidly in position both axially and laterally as to distances apart from one another. Adjustable rods 64, each provided with an eye 64' for fitting over the anchor bolt 64", see FIGS. 8 and 9, effectively tie adjacent bin tops 42 together for lateral strength; such rods 64 being threaded and provided with a threaded adjusting collar 60 whereby they may be tightened or loosened, as desired.

When the continuous bins 12 of the structure are formed by the erection of the structural members 13 and the bolting thereof in position, an initial placement of post-tensioning bars 36 in conduits 37 is made; such bars being locked into place by conventional cone locks, not shown, to afford only initial positioning of the bars. The joints 25 between adjacently located wings 22, 23 and 26, 27 are then poured, using grouts to develop strength; the concrete joints being processed preferably but not necessarily with vacuum processing as in the case of forming or casting of the structural members 13. When these joints have cured to the requisite design strength, the reinforcing rods 33 as well as the bars 36 will be post-tensioned to give them their final stress, utilizing the post-tensioning plate 37 and standard stressing mechanisms, so that all of the structural members 13 will be locked with their compressive forces and will function as designed. Since the structural members 13 are supported during the building of the elevator at not less than five points, a very stable structure is presented at all times during the construction. Since the bin bottoms 41 are all preformed with all necessary slopes, no additional concrete other than grout, as indicated at 65, will be required to be poured inside the bins 12 after the structural members 13 have been erected and their joints poured, except for the pouring of grouts, as at 65', to join adjacent bin tops 42 and embed the reinforcing elements 58 therein to insure strong lateral support of the plurality of slabs constituting the bin tops 42 and forming a homogeneous over-all closure tying the tops of the structural members 13 together and also forming a complete diaphragm at the upper limits of the structure 11. Subsequent erection of machinery spouting, electrical work and enclosures are conventional and form no part, per se, of my invention in the improved structure 11, as exemplified in a grain elevator.

In FIGS. 14 and 15 of the annexed drawings, I have schematically illustrated a modified embodiment of a structural member, which is designated by the reference numeral 113, and a modified embodiment of my improved structure, as exemplified in a grain elevator, which is designated generally by the reference numeral 111. In constructing the modified structure 111, I have provided therein a plurality of cells or gain bins 112 which are fashioned to an octagonal cross-section, as well as a plurality of interstitial smaller cells or bins 112′ which are of square cross-section, as shown. In the use of this modified grain elevator, it is contemplated that the interstitial bins 112′ be employed as blending bins with the grain contained therein mixed with the grain stored in bins 112 in predetermined proportionate amounts at the rate of discharge or removal of the grain from the elevator.

The modified embodiment of my improved structural member 113 constitutes a precast prestressed reinforced concrete unit which generally is cast in the same manner and with the same reinforcing components, although not shown in FIGS. 14 and 15, as the preferred embodiment of structural member 13 which I have illustrated in FIGS. 6 and 7, with the exception that the forms employed in the casting of the modified embodiment 113 are so arranged that such modified embodiment is angularly asymmetrical. With specific reference to FIG. 15, it will be observed that the modified structural member 113 comprises a pair of hub sections 118 and 119, which are in spaced relationship to one another and connected together by a spanning web 121. Preferably, each of the hub sections 118 and 119 are of the same length and I form on hub section 118 a pair of wings 122 and 123 which project the same distance from the center of hub section 118, or are of equal width, but which so extend radially therefrom and in spaced relationship to one another as to define an angle of approximately 90° therebetween. By so fashioning the wings 122 and 123 on hub section, there are defined angles of approximately 135° each between the wing 122 and the web 121, and between the wing 123 and the web 121. Similarly, the modified structural member 113 is so formed or cast as to provide a pair of wings 126 and 127 on the hub section 119 thereof, such wings 126 and 127 extending radially but in spaced relationship to one another so as to define an angle of approximately 90° therebetween, and angles of 135° each between the wing 126 and the web 121, and between the wing 127 and the web 121 of the modified embodiment of structural member 113. It is within the purview of this invention to provide legs, not shown in FIG. 15, projecting from one end of the member 113 in spaced relationship to one another and projecting from the corresponding ends of the wings 122, 123, and 126, 127, in the same manner as the legs 28 and 29 are provided on the preferred embodiment 13, illustrated on FIGS. 6 and 7. It is further within the purview of my present invention to omit the legs 28 and 29 from the preferred embodiment as well as the modified embodiment of my improved structural members 13 and 113, and employ such exemplifications of such structural members in different environments or in different types of structures than the structures 11 and 111, such as in the roof structure shown in FIGS. 17–21 inclusive, hereinafter described or in the piling structure shown in FIGS. 24, 25 and 26.

It is contemplated, however, that in grain elevator structures of the type shown in FIG. 14, the modified structural member 113 therein incorporated will be provided with legs so that the bins 112 and 112′ of such structure 111 will be supported at an appreciable elevation from a base, not shown in FIG. 14, in the same manner as the legs 28 and 29 of the structural members 13 support the bins 12 of the grain elevator 11 above the base 16, see FIGS. 2 and 3. Thus, in both instances, considerable space, as indicated by the reference numeral 130, is made available below the bins 12, 112 and 112′ in the preferred and modified embodiments of my improved structures, as exemplified in grain elevators 11 and 111, respectively, for the installation and movement of required or desirable transport conveyors and other equipment, as well as affording desirable ventilation and light. The modified embodiment of structural member 113 is also fashioned with haunches, not shown in FIG. 15, in the same manner and at the same location as the haunches 30 of the preferred embodiment of the invention in improved structural members, for seating bin bottoms during the erection of the structure 111. While bin bottoms and bin tops are not shown in FIG. 14 it is contemplated that precast reinforced concrete bin bottoms of generally cone shape will be used in the structure and seated on the haunches of the structural members 113 and bolted thereto in the same manner as the bin bottoms 41 of the preferred embodiment of the structure, designated by the reference numeral 11, are cast and secured in positions. It is, of course, understood that the bases of the bin bottoms of the structure 111 will conform to the generally octagonal configuration of the bins 112 and that some of the bin bottoms of the structure 111 will follow the configuration of the interstitial bins 112′. Moreover, while bin tops are not shown in FIG. 14, it is to be understood that precast reinforced concrete slabs will be cast in generally octagonal cross-section, as well as in square cross-section, to meet the requirements or conform to the configurations of the bins 112 and 112′, respectively, and these various slabs will be initially supported on the laterally extending flanges of hangers, not shown, which are bolted to the tops of the structural members 113, at the joints between contiguous wings of such structural members, all not shown in FIG. 14, in the same manner as the individual bin tops 42 of the structure 11 are positioned. All adjacently disposed bin tops of the structure 111 can be united by grouting in the same manner as the plurality of precast reinforced concrete slabs, or bin tops 42, of the structure 11 are united, see FIG. 1, to form a homogeneous over-all bin top for all of the bins 112 and 112′ of the modified structure 111.

It is to be observed, with reference to the right center bin, designated 112A, of the structure 111 shown in FIG. 14, that the bounding vertical walls of each of the bins 112 of generally octagonal cross-section are formed by four of the modified structural members 113 shown in FIG. 15, together with four poured joints 125 at the points indicated by the solid lines. In this view, the four structural members for cell or bin 112A have been designated by the reference numerals and characters 113A, 113B, 113C and 113D, reading clockwise about the bin. As shown, the web 121 of member 113A constitutes one wall of the bin, while the wings 123 and 127 form approximately one-half of adjacent walls. The member 113B constitutes another wall of bin 112A, with its wing 122, together with poured joint 125 and the wing 123 of member 113A forming an intermediate wall of the bin. Wing 126 of member 113B forms approximately one-half of an additional wall of the bin. The web 121 of structural member 113C constitutes another wall of such bin, with wing 122 and poured joint 125 together with wing 126 of member 113B completing an intermediate wall. The other enclosing wing 126 of structural member 113C forms a part of another intermediate wall. Moreover, the web 121 of structural member 113D constitutes a further wall of bin 112A, with wing 127 of such member 113D, together with the poured joint 125 and the wing 126 of the member 113C, forming the intermediate wall on one side and the wing 123 of member 113D together with the joint 125 and the wing 127 of member 113A forming the intermediate wall on the other side of the web 121 of member 113D. Since there are angles of 90° between each pair of wings 122, 123 and 126 and 127 of each of the structural members 113A, 113B, 113C and 113D, the wings 123 and 122, respectively, of the members 113A and 113B define one side of an adjacent interstitial square cell of bin 112', with wings 122 and 123, respectively, of such structural members 113A and 113B defining parts of opposite sides of this same adjacent interstitial cell 112'.

The remaining fragments of interstitial cells, adjacent to bin 112A, can be similarly traced, and other generally octagonal bins 112 with adjacent interstitial bins 112' also can be similarly traced. It is to be further noted, as indicated by the fragmentary showings of the wings 123 and 127 of the structural member 113C at the far right of the view of FIG. 14, as well as indicated by the fragmentary showings of the wings of other structural members 113 at the far left and bottom of FIG. 14 that my improved modification of structure, as exemplified in the grain elevator 111, can be expanded in any direction to any desired dimensions, as is also the case of the embodiment of grain elevator designated by the reference numeral 11 and shown in FIGS. 1–5, inclusive.

In FIG. 16 of the annexed drawings, I have illustrated a still further embodiment of my improved structural member which is generally designated by the reference numeral 113'. While this modification of structural member may not be economically expedient or feasible for application to such grain elevator structures 11 and 111, hereinabove described, such modified structural member 113', as well as that depicted in FIG. 23 which is more particularly hereinafter described, can be effectively utilized in such structures as the roof component of FIGS. 17–19 or in the apartment house structure of FIG. 22. As shown in FIG. 16, the modified embodiment of my improved structural member is both angularly asymmetrical and is asymmetrical as to width of wings. This modification comprises a hub section 118' of predetermined length and having a substantially straight axis, together with three wings 122', 123' and 124' extending radially from hub section 118' at unequal angular relationships to one another; such wings preferably being equal in length and coextensive with the length of the hub section 118' but unequal in width. Preferably, the angle between the axes of the wings 112' and 123' is approximately 90° while the angles between the axes of the wings 122' and 124', on the one hand, and between the axes of the wings 123' and 124', are approximately 135° each. Also I preferably form the wings 122' and 123' of equal width and the wing 124' of greater width; it being understood, of course, that all three of such wings may be made of different width and that any two thereof can be of the same width with the third wing either of greater or less width than the widths of the other wings, all within the purview of scope of this improvement. Further, that the irregular or variable angular relationship between the wings 122', 123' and 124' can be different than that shown in FIG. 16 which is only an example to typify the invention in such structural member 113'. This is true in every sense with respect to the structural member 113 shown in FIG. 15, and the measurements of the wings as five feet with angles of 90° and 135° in FIG. 15 as well as the measurements of five feet for wings 122' and 123' of member 113' and of eight feet for the wing 124' of such member are only for purposes of illustration and examples. It is to be further understood that the modified structural member 113' of FIG. 16 is a precast reinforced concrete unit which may be cast in the same manner as the embodiments designated by the reference numerals 13 and 113, and preferably although not necessarily utilizing vacuum processing during the casting.

The modified embodiment of my improved structure which is illustrated in FIGS. 17–21 inclusive, exemplifies but one of many possible horizontal applications of my improved structural members. In these views, there is illustrated a roof component, designated generally by the reference numeral 211, of a typical building 212 provided with a store front 212', both shown in fragmentary elevation. The building 212 may rise from any suitable concrete foundation of separately disposed slabs 214, as shown. The roof component 211 preferably is assembled from a plurality of individual precast reinforced concrete structural members 217, which are supported by girders 218. All of the structural members of the roof component 211 preferably are angularly symmetrical insofar as the wings 221, 222 and 223 thereof are concerned. Each of the plurality of girders 218 preferably is of the same general construction as the preferred embodiment 13 of the present invention, except that girders 218 are formed with a relatively short web 224, and these girders are arranged longitudinally with the wings 222', 223' thereof in a top relative position and the wings 226', 227' thereof in a bottom position, all as shown in FIGS. 18, 19 and 20. A plurality of skylights 230, see FIGS. 17 and 18 are arranged in desired locations in roof structure 211 with closure caps 231 spanning the same, such caps 231 preferably being fabricated of translucent material for admitting sunlight. As shown particularly in FIG. 21, adjacent wings of juxtaposed structural members 217 are conveniently connected together by means of angle clips 232 which are fastened to the outer ends of adjacent wings by means of bolts 233, and then the joint is poured with grout to provide strong connections.

A still further modification of my improved reinforced concrete structure is illustrated in FIG. 22 wherein I have shown a sectional view of such modification as exemplified in an apartment house 311 of generally circular contour, this view being taken on one of the lower levels of the structure. In this apartment house exemplification of my present invention, it is possible to utilize reinforced concrete structural members which are symmetrical in every respect as to angular relationships of the wings to one another in some instances, angularly asymmetrical in other instances, and also in some cases to employ my improved structural members which are asymmetrical as to width of the different wings thereon whether the structural members comprise two hub sections connected by a web and of two wings each, or a single hub section having three wings thereon. Thus either the structural member of FIGS. 6 and 7, with or without the legs thereof, or that shown in FIGS. 15 and 16, or those shown in FIGS. 22 and 23, or all or any combination of such structural members, designated generally by the reference numerals 313, 313', 313A and 313B, may be employed in the apartment house illustrated in FIG. 22, which in this view are all angularly symmetrical but in some instances asymmetrical as to wing width. And such structural members together with other structural components not shown or claimed herein, can be united together in the apartment house 311 in such manner as to provide either square, hexagonal, octagonal or even oval shaped or circular apartments on the same or different levels of the apartment house. Moreover, some of the aforesaid structural members 313, 313', 313A and 313B may be shortened or lengthened, as desired or required within prescribed engineering design and concepts as to placement thereof, and utilized as girders, beams or columns of the apartment house 311.

The modified structural member illustrated in FIG. 23, which is generally designated by the reference numeral 413, is angularly symmetrical but asymmetrical as to the width of its wings. This modification is a precast reinforced concrete unit, with prestressed reinforcing members therein as in the case of the other structural members, defining a central hub section 419, and three wings 421, 422, 423 thereon which extend radially therefrom at 120° angles apart, as shown. While, I have depicted the structural member 413 with its wing 421 wider than the wings 422 and 423, which are shown of equal width, it is within the purview of the present invention to form all three wings of different widths or to form two of them of longer widths than the other. The wings 421, 422 and 423 preferably are formed coextensive with the length of the hub section 419.

It will appear from an observation of FIGS. 24–27 inclusive of the annexed drawings that my improved reinforced concrete structural members have vertical applications other than those illustrated in FIGS. 1–5; FIG. 14; FIGS. 17–21 and FIG. 22. In the vertical application of FIG. 24, a caisson type piling 511 defining a plurality of relatively close interstitial spaces 512 bounded by individual piles 513 is provided adjacent to a waterway 514 which may be a ship channel. The individual piles 513 preferably are of the type shown in FIGS. 6 and 7, with legs omitted, while additional piles, designated 513A, may form a part of the caisson piling 511, which pile 513A may be of the type shown in FIG. 15 of the drawings. The tops of the individual piles 513 and 513A are brought into and maintained coplanar in a horizontal plane so that a horizontally disposed concrete slab 516 can be placed thereon and connected thereto; such slab 516, being generally similar to the flooring or base 16 on which the grain elevator 16, see FIGS. 1–5 inclusive, is erected and constituting, in effect, a pier alongside of which cargo ships may be docked in the ship channel 514 for unloading. The caisson piling 511 may support on its overlying connected slab 516 any desired super-structure 511'. In FIG. 24, I have indicated, by fragmentary view, that the super-structure 511' may be a grain elevator either of the type 11, having bins of hexagonal cross-section as shown in FIGS. 1–5 inclusive, or a grain elevator of the type 111 containing bins of octagonal cross-section as well as interstitial blending bins of square cross-section, as illustrated in FIG. 14 of the annexed drawings.

As indicated in FIG. 24, the ship channel 514 may be formed by means of dredging to deepen the waterway to a desired extent; the dredging operations removing considerable quantities of mud, designated generally by the reference numeral 517, of which the dredged out area is designated 517A, as well as a strata of soft plastic sub-soil 518 overlying a rock or other relatively hard and firm foundation 519 which is often undulatory or irregular insofar as its surface is concerned. Consequently, the individual piles 513 are of irregular heights in order that when erected, the caisson piling 511 will present the tops of the piles 513 in the same horizontal plane above the water line 520 for mounting thereon of the horizontally disposed pier 516. The individual piles 513 may each constitute a slight modification of the preferred embodiment of my improved structural member hereinabove described and designated by the reference numeral 13; the modification consisting of omitting the protruding legs 28 and 29 thereof. Otherwise, the individual piles 513 are fashioned as the structural members 13 in that they each are a precast reinforced concrete unit containing prestressed elements and reinforcing rods, together with preformed conduits into which reinforcing bars are installed and post-tensioned in the same manner as precasting the structural members 13. The thus precast individual piles 513 include as integral parts thereof, a relatively long web 521 from opposite ends of which radially extend the angularly spaced wings 522, 523, and 526, 527, respectively. Preferably, the individual piles 513 are angularly symmetrical so that the angles between the web and adjacent wings are 120° and the angles between each pair of wings is 120°, all as shown in FIG. 25 with certain wings 522, 523 of one structural member or pile 513 arranged contiguous to and in alignment with corresponding wings 522, 523 of an adjacently disposed pile. This arrangement of the individual piles 513 to provide the caisson piling 511 effects a compartmentation of the plastic sub-soil of mud 517 and strata 518 containing in the interstitial spaces 512 the plastic sub-surface which would normally be subject to extensive lateral flow.

In placing the caisson piling 511 in operative position, the individual piles 513 may be driven through the plastic sub-soil in approximately 30 to 60 seconds by means of an ultra high-frequency sonic driver, not shown, which is currently available and utilized for driving piles which may readily be employed for constructing the caisson piling 511 in the customary manner by those skilled in the art. The bearing ends or bottoms of the individual structural members or piles 513 will thus be embedded in the non-movable, impervious bearing strata or foundation 519, and the upper ends of such piles secured by means of post-tensioning or conventional reinforcement connection with either a pile cap or by the concrete slab 516 constituting a pier. When the caisson piling 511 is constructed adjacent to a ship channel, such as the channel 514, interlocking steel or concrete elements, such as an H-shaped section 530, see FIGS. 25 and 26, may be slid between the joints of the adjacent wings of the individual piles 513 along the perimeter of the caisson piling 511, thus confining the plastic sub-surface to prevent movement or shifting thereof and otherwise to fill the ship's channel 514 requiring recurrent re-dredging thereof.

Another modification of vertical application of my improved structural members, serving as pilings, is illustrated in fragmentary elevational detail in FIG. 27. In this modification, a caisson type piling 611 can be provided of a plurality of adjacently disposed structural members 613 which are of my preferred embodiment as illustrated in FIGS. 6 and 7 each consisting of precast reinforced concrete and supporting a super-structure 611' which may be a grain elevator of the type shown in FIGS. 1–5 inclusive, or as shown in FIG. 14. As shown in FIG. 27, the super structure 611' seats on a horizontally disposed concrete slab 616 connected to the tops of the individual piles 613. The construction is such that the piling 611 appears to and can be a mirror image of the super-structure 611'. It is clear that each of the individual structural members or piles 613 constitute an inverted preferred structural member, designated by the reference numeral 13 hereinabove and illustrated in FIGS. 6 and 7, in that each pile 613 comprises a web 621 on each end of which a pair of radially extending wings are integrally contained, but one pair of wings, designated by the reference numerals 622 and 623 are shown in FIG. 27, and also includes a pair of legs 628 and 629 which protrude from one end of the web 621 and wings 622 and 623. The caisson piling 611 is otherwise similar to the piling 511 shown in FIGS. 24–26 inclusive, and effectively affords a compartmentation of the sub-soil to confine and contain the same against shifting or lateral movement.

Other horizontal applications of my improved structural members affording modifications of improved structures are illustrated in FIGS. 28–30 inclusive of the annexed drawings. In FIGS. 28 and 29, a bridge structure or viaduct, designated by the reference numeral 711, provides incorporated improved structural members 713 and 713' comprising both double hub sections and single hub sections with wings of the same lengths as the hub sections and of equal widths extending radially therefrom in symmetrical angular relationships to one another and the hub sections. As illustrated in FIG. 28, the viaduct or bridge 711 may be interposed in a highway 714 extending up and over the bridge or viaduct which spans a chasm between one hillside 715 and another hillside 715' with a canyon or river 716 underlying the bridge which is supported at its opposite ends by suitable buttresses 717 and 717' on the hillsides 715 and 715', respectively.

With particular reference to the elevational view of FIG. 29 illustrating the bridge structure 711, it will be observed that the bridge-truss thereof comprises a plurality of my preferred reinforced concrete structural members 713, of the type depicted in FIGS. 6 and 7 but with legs omitted, and intermediate structural members of the type shown in FIG. 15 but with the wings thereof in symmetrical angular relationships; such types of structural members being disposed so as to present top surfaces of wings thereof coplanar in a single horizontal plane. For example, one structural member 713 consists of a pair of hub sections 718 and 719 in spaced relationship to one another and connected together by a spanning web 721; each hub section 718 and 719 being integral with a pair of radially extending wings 722, 723 and 726, 727, respectively, which lie on opposite sides of web 721 and which are angularly symmetrical with respect to one another and to said web. The said one structural member 713 is supported by a buttress 717 underlying and engaging the tip of wing 722 of the structural member so as to maintain the other wing 723 of the pair of wings on hub section 718 in a vertical position underlying but engaging with its top surface the bottom of the bridge roadway, which may be one or more concrete slabs 725, and with the wing 726 also disposed in a vertical plane and the other wing 727 of the pair of wings on hub section 719 of the structural member 713 disposed at an angle of 120° from the wing 726 as well as at an angle of 120° from the axis of hub section 719.

The bridge-truss of the bridge 711 also includes a second structural member, conveniently designated generally by the reference numeral and character 713A which is supported by the buttress 717' on hillside 715'. As shown, the second structural member 713A is similar to the said one structural member 713 but is disposed in spaced relationship thereto and oppositely directed. Such second structural member 713A of the bridge-truss consists of a pair of hub sections 718A and 719A spanned and integrally connected together by a web 721A and including a pair of wings 722A and 723A on hub section 718A and a pair of wings 726A and 727A on hub section 719A. The second structural member 713A is so mounted that the buttress 717' underlies and supports the tip of wing 723A with the other wing 722A of the pair of wings on hub section 718A underlying and engaging with its top surface the bottom of roadway 725 in spaced relationship to the point of engagement of the wing 723 of structural member 713 with such roadway. This mode of supporting the structural member 713A in the bridge truss disposes the wing 727A in a vertical position with its companion wing 726A extending at an angle of 120° from the vertically disposed wing 727A as well as at an angle of 120° from the axis of hub section 719A. In addition, the bridge-truss for the bridge structure includes one or more of the structural members 713' which is symmetrical both as to the widths of its three wings 722', 723' and 724' but also with respect to the angular relationship of the wings one to the other and with respect to the axis of its single hub section 718' from which the wings radially extend. The single hub section structural member 713' is so disposed in the bridge-truss that wing 722' is vertically disposed and engages, with its top surface, the bottom of bridge roadway 725 equidistant from the engaging points of the wings 723 and 722A of the structural members 713 and 713A with such roadway 725. The width of the roadway 725 in any given instance, determines the widths of the wings 723. The roadway 725 may be constructed of a number of aligned and connected concrete slabs with the terminal slabs on opposite sides of the roadway extended and sloped upwardly to provide integral side rails 735 and 735'. In order to provide a stability to the bridge-truss constituting a component of the bridge structure 711, the outer ends of the wings 723' and 724' of the structural member 713' are joined by means of concrete joints 740' and 740A, similar to joints 25, see FIGS. 2 and 3, to complete and define an integral bridge-truss. While not shown in the drawings, buttresses may be provided for engaging the bottom surfaces of wings 726 and 727A of the structural members 713 and 713A, respectively. The roadway 725 may be of two or more lanes for permitting passage of vehicles 740 in opposite directions.

The showing in FIG. 30 is schematic and illustrative of another application of my improved structural members to provide unique and improved structure 811. This showing of FIG. 30 could constitute a double-deck bridge or could comprise a portion of a two-level or multi-level garage for storage of vehicles. It is to be noted that while the structural members shown in FIG. 30, designated generally by the reference numerals 813, 813A, 813B and 813C, are depicted as double-hub section members with pairs of wings on each hub section extending radially therefrom in angularly symmetrical relationship to one another and to the webs of the members, it is within the contemplation and purview of my present invention to provide in the structure 811 of FIG. 30 component structural members wherein the pairs of wings are angularly asymmetrical. However, as to the structure of FIG. 30, it will be noted that the folded plate principle of construction, in effect, has been adopted in that the aligned structural members are interlocked vertically at their junctures as horizontally aligned. As shown, I provide in this modified structure of FIG. 30, a plurality of reinforced concrete structural members 813, 813A, 813B and 813C each preferably being of the embodiment depicted in FIGS. 6 and 7 of the annexed drawings except that the protruding legs thereof are omitted. Such structural members 813, 813A, 813B and 813C, each comprises a pair of hub sections 818 and 819 which are connected together by a spanning integral web 821, and on each hub section there are provided a pair of radially extending wings 822, 823, and 826, 827, respectively, which are angularly symmetrical with respect to one another as well as with respect to the webs 821. The plurality of structural members are so disposed and connected together that the webs 821 of the two structural members 813 and 813A lie horizontally and coplanar at one level of the structure, while the webs 821 of the structural members 813B and 813C lie in a horizontal plane and coplanar at a lower level than the web 821 of the members 813 and 813A. With the structural members so assembled, the hub sections 818 and 819 of structural members 813 and 813B are vertically aligned in pairs, and the hub sections 818 and 819 of the members 813A and 813C are vertically aligned in pairs. As shown, the wings 822 and 826 of the structural member 813B, as well as the wings 822 and 826 of the structural member 813C all rest upon joists or beams or girders 816 which, although not indicated in FIG. 30, can be improved reinforced concrete structural members of my preferred embodiment illustrated in FIGS. 6 and 7, with protruding legs thereof omitted. The girders or beams 816 obviously are of sufficient number and so spaced apart in underlying relationship to the widths of the wings 822 and 826 of the lower structural members 813B and 813C as to effectively support a structure 811 of any given height and length and of any given number of levels.

In order to provide stability and strength to the structure 811, the junctures between the wings 826 of the two upper structural members 813 and 813A, shown in FIG. 30, and the wings 823 and 827 of the two lower structural members 813B and 813C of such structure are joined together by means of angle clips, not shown, which are fastened to the outer ends of adjacent wings by means of bolts, also not shown, and the joints then poured with grout to provide strong connections. If exemplified in a two level bridge, the structure 811 can be so marked as to permit movement of vehicles 840 in opposite directions, as provided by the upper surfaces of each of the webs 821 of the structural members 813, 813A, 813B and 813C. Or, if exemplified in a multi-level garage, the various webs 821 of the structural members can serve as platforms or floors or corridors for the storage of vehicles and movement of the same thereover. Suitable on and off ramps, of course, would have to be provided should the structural members be assembled in a garage application or adaptation.

In whatever structure for horizontal or vertical applications of my improved structural members that may be erected, it is to be understood that the reinforcing rods and bars placed therein are preliminarily post-tensioned during the erection of the structure and finally post-tensioned after all joints have been poured between contiguous components or parts of the structural members. Moreover, all of the reinforcing elements, rods and bars that are embedded therein are preferably prestressed.

It is to be understood that the appended claims are to be accorded a range of equivalents commensurate in scope with the advances made over the prior art.

I claim:

1. A reinforced concrete structural member comprising a pair of hub sections, a web spanning said hub sections and maintaining their longitudinal axes substantially parallel, a pair of wings on each of said hub sections of equal width and coextensive in length to the lengths of said hub sections; said wings extending radially from said hub sections in asymmetrically angular relationship, a plurality of prestressed reinforcing elements embedded in said hub sections and said wings longitudinally thereof and in spaced relationship to one another, a plurality of reinforcing rods embedded in said web and arranged transversely thereof in spaced relationship to one another; said reinforcing rods extending from opposite sides of said web and being adapted to be post-tensioned, and a plurality of conduits embedded in said wings transversely thereof and in spaced relationship to one another; said conduits being adapted to hold reinforcing bars which may be post-tensioned.

2. A reinforced concrete structural member as defined in claim 1, and a pair of legs projecting from one end of said member in spaced relationship to one another and each containing extensions of said embedded longitudinally extending prestressed reinforcing elements.

3. A reinforced concrete structural member as defined in claim 1 wherein the angle between the axis of each of said pair of wings is a right angle, and the angle between the axis of one wing of each of said pair of wings and said web is greater than a right angle but less than 180°.

4. A reinforced concrete structural member comprising a hub section of predetermined length, three wings of equal width and coextensive with the length of said hub section projecting radially therefrom in asymmetrical angular relationship to one another, a plurality of prestressed reinforcing elements embedded in said hub section and said wing longitudinally thereof, and a plurality of conduits embedded in said wings transversely thereof and in spaced relationship to one another; said conduits being adapted to hold reinforcing bars that may be post-tensioned.

5. A reinforced concrete structural member comprising a hub section of predetermined length, three wings projecting radially from said hub section in symmetrical anguar relationship to one another; at least one of said wings being of greater width than the width of the others of said wings, a plurality of prestressed reinforcing elements embedded in said hub section and each of said wings longitudinally thereof, and a plurality of conduits embedded in said wings transversely thereof for holding a plurality of reinforcing bars which are adapted to be post-tensioned.

6. A reinforced concrete grain elevator wherein a plurality of bins of hexagonal cross-section are provided, said elevator comprising precast reinforcing structural members defining the perimetrical walls of said bins, each of said structural members consisting of a pair of spaced apart hub sections, a web spanning said hub sections and maintaining their longitudinal axes substantially parallel, a pair of wings of equal width on each of said hub sections projecting radially therefrom and coextensive in length to the lengths of said hub sections, a pair of legs projecting from one end of said wings, and a haunch on each side of each of said wings and said web adjacent to the end thereof from which said legs project, a precast reinforced bin bottom for each of said bins seated on said haunches of said structural members bounding each of said bins, and a precast reinforced bin top for each of said bins seated upon and secured to the tops of said structural members bounding each of said bins.

7. A reinforced concrete grain elevator comprising a plurality of bins of hexagonal cross-section arranged in a honeycomb pattern, a plurality of precast reinforced concrete structural members forming the perimeters of said bins; each of said structural members comprising a pair of spaced apart hub sections, a web spanning said hub sections and maintaining their longitudinal axes substantially parallel, a pair of wings of equal width and coextensive in length with the lengths of said hub sections radially extending at equal angles from each of said hub sections, a pair of legs projecting from one end of said wings, and a haunch on each side of each of said wings and said web adjacent the end thereof from which said legs project, a plurality of prestressed reinforcing elements embedded in said hub sections and said wings and said legs longitudinally thereof, a plurality of reinforcing rods embedded in said web spaced relationship and transversely thereof, and a plurality of conduits embedded in said wings transversely thereof for the reception of reinforcing bars which may be post-tensioned, a precast reinforcing bin bottom seated on the haunches of the bounding structural members of each bin and connected thereto; each of said bin bottoms having a closable discharge opening therein, and a precast reinforcing bin top secured to the tops of the bounding structural members of each of said bins; each of said bin tops having a spout opening therein to enable filling of the bins.

8. A reinforced concrete grain elevator, as defined in claim 7 wherein the angle between the wings of each of said pair of wings is in excess of 90°.

9. A reinforced concrete grain elevator, as defined in claim 8 wherein the angles between said web of said structural member and each of said wings of each of said pair of wings are in excess of 90°.

10. A reinforced concrete grain elevator comprising a plurality of bins of octagonal cross-section, a plurality of smaller interstitial cells between otherwise contiguous bins of octagonal cross-section, a plurality of reinforced concrete structural members bounding said bins and said cells; each of said structural members comprising a pair of spaced apart hub sections, a web spanning said hub sections, a pair of wings on each of said hub sections and projecting radially therefrom angularly asymmetrical with respect to said web and said hub sections, a pair of legs projecting in spaced relationship from one end of said wings, a haunch of each side of each of said wings and said web adjacent to the end from which said legs project, a plurality of precast reinforced bin bottoms seated on said haunches of and connected to said structural members bounding said bins, a plurality of cell bottoms seated on said haunches of and connected to said structural members bounding said cells, a plurality of precast reinforced concrete bin tops secured to the tops of said structural members bounding said bins, and a plurality of cell tops secured to the tops of said structural members bounding said cells.

11. A precast reinforced concrete grain elevator structure as defined in claim 10 wherein the angle between the wings of each pair of wings on said structural member is a right angle.

12. A reinforced concrete structure, as exemplified in a single level multi-laned bridge over which vehicles may pass in opposite directions, said structure comprising a first group of precast reinforced concrete structural members arranged in spaced relationship to one another, at least one of a different precast reinforced structural member intermediate two of said first group of structural members; each structural member of said first group thereof comprising a pair of hub sections, a web spanning said pair of hub sections and integral therewith, and a pair of wings on each of said hub sections arranged in angularly symmetrical spaced relationship to one another and to said web, means for supporting said first group of said structural members to present one wing on one hub section of each of said structural members of said first group thereof in a vertical position with the upper surfaces of said wings coplanar and lying in a horizontal plane; each of said different structural members comprising a single hub section, and three wings on said hub section arranged in angularly symmetrical spaced relation to one another and to the axis of said single hub section, means connecting two of said wings of said different structural member to adjacent wings of said structural members of said first group thereof and to present said other wing of said three wings of said different structural member in a vertical plane with its upper surface lying in a horizontal plane coplanar with the horizontal upper surface of said vertically presented wings of said structural members of said first group thereof, and a reinforced concrete slab seated upon the upper surfaces of said vertically disposed wings of said first group of said structural members and the upper surface of said vertically presented wing of said different structural member to afford to a surface over which vehicles may pass in opposite directions.

13. A reinforced concrete structure, as exemplified in a multi-level bridge or vehicle storage building; said structure comprising a first structural member, a second structural member, a third structural member and a fourth structural member connected together to present said first and said second structural members at one level and to present said third and said fourth structural members at a different level and underlying said one level; each of said structural members comprising a pair of hub sections, an integral web spanning said hub sections and maintaining said hub sections in spaced relationship to one another, a pair of wings on each of said pair of hub sections; each of said pair of wings being spaced apart in angularly symmetrical relationship to one another and to said web and extending radially from said hub sections with the wings of each pair of wings lying on opposite sides of said webs, means engaging the tips of one wing of each pair of wings each of said third and fourth structural members to support said connected structural members with the webs of said first and said second structural members coplanar in a horizontal plane at said one level and with the webs of said third and said fourth structural members coplanar in a horizontal plane at said different level underlying the webs of said first and said second structural members so that vehicles may pass over the webs of said structural members at different levels and in the same or opposite directions, or vehicles may be stored on said webs of said structural members.

14. A structural member comprising a pair of hub sections of equal length, a web spanning said hub sections and maintaining their longitudinal axes substantially parallel, and a pair of wings on and extending radially from each hub section of said pair of hub sections; at least one of said wings being of different width than the widths of the others of said wings.

References Cited by the Examiner
UNITED STATES PATENTS

| | | | |
|---|---|---|---|
| 87,634 | 3/1869 | Clark | 52—194 |
| 93,352 | 8/1869 | Sampson | 52—194 |
| 459,806 | 9/1891 | Wilson | 52—237 |
| 1,069,917 | 5/1913 | Luten | 52—174 |
| 1,070,434 | 8/1913 | Farquhar | 52—199 |
| 1,097,269 | 5/1914 | Thomas | 52—87 |
| 2,202,745 | 5/1940 | Muse | 52—285 |
| 2,350,018 | 5/1944 | Dean et al. | 52—250 |
| 2,454,403 | 11/1948 | Palmieri | 52—245 |
| 2,746,283 | 5/1956 | Abrams | 52—237 |
| 2,927,452 | 3/1960 | Heidenstam | 52—224 |
| 2,947,118 | 8/1960 | Rockwell | 52—459 |
| 2,993,409 | 7/1961 | Boyd | 52—306 |

FOREIGN PATENTS

| | | |
|---|---|---|
| 238,605 | 8/1925 | Great Britain. |
| 782,965 | 9/1957 | Great Britain. |
| 827,936 | 2/1960 | Great Britain. |

FRANK L. ABBOTT, *Primary Examiner.*

WILLIAM I. MUSHAKE, HENRY C. SUTHERLAND, *Examiners.*

J. L. RIDGILL, *Assistant Examiner.*